US010731694B2

(12) United States Patent
Pena

(10) Patent No.: US 10,731,694 B2
(45) Date of Patent: Aug. 4, 2020

(54) TENSION RELEASE SYSTEM

(71) Applicant: Landscape Structures Inc., Delano, MN (US)

(72) Inventor: Felipe Pena, Southlake, TX (US)

(73) Assignee: Landscape Structures Inc., Delano, MN (US)

( * ) Notice: Subject to any disclaimer, the term of this patent is extended or adjusted under 35 U.S.C. 154(b) by 109 days.

(21) Appl. No.: 15/697,938

(22) Filed: Sep. 7, 2017

(65) Prior Publication Data

US 2017/0363131 A1 Dec. 21, 2017

Related U.S. Application Data

(63) Continuation-in-part of application No. 15/468,712, filed on Mar. 24, 2017.
(Continued)

(51) Int. Cl.
*E04F 10/02* (2006.01)
*F16B 31/04* (2006.01)
*E04H 15/58* (2006.01)
*E04H 15/32* (2006.01)
*E04H 15/04* (2006.01)
*E04H 15/26* (2006.01)
(Continued)

(52) U.S. Cl.
CPC ............. *F16B 31/04* (2013.01); *E04F 10/02* (2013.01); *E04H 15/322* (2013.01); *E04H 15/58* (2013.01); *E04F 10/0681* (2013.01); *E04H 15/04* (2013.01); *E04H 15/26* (2013.01); *E04H 15/64* (2013.01); *F16G 11/12* (2013.01)

(58) Field of Classification Search
CPC ........ E04F 10/02; E04H 15/322; E04H 15/58; E04H 15/60

USPC ........ 254/98, 100, 102, 231; 256/37, 40, 43, 256/44, 67, 69
See application file for complete search history.

(56) References Cited

U.S. PATENT DOCUMENTS 2,001,196 A * 5/1935 Jost .................... E04H 15/28
 135/98
2,120,497 A * 6/1938 Heinrich ................. F16G 11/12
 248/219.4
(Continued)

OTHER PUBLICATIONS

U.S. Appl. No. 15/468,712 Office Action dated Jul. 23, 2019, 10 pages.

*Primary Examiner* — Johnnie A. Shablack
(74) *Attorney, Agent, or Firm* — Wesley W. Malherek; Kelly, Holt & Christenson PLLC

(57) ABSTRACT

A method of installing a releasable shade membrane to a shade system is presented. The method comprises installing a tension release system within a structural component of the shade system. The tension release system comprises a threaded member configured to, when actuated, cause a coupling mechanism to move along an axis defined by the threaded member. The method also comprises coupling a shade membrane to the coupling mechanism. The method also comprises actuating the threaded member in a first direction, such that the coupling mechanism moves along the axis in a tensioning direction. The tension release system is configured to release applied tension upon actuation of the threaded member in a second direction, causing the coupling mechanism to move along the axis in a release direction. The release direction is substantially the reverse direction of the tensioning direction.

19 Claims, 27 Drawing Sheets

Related U.S. Application Data

(60) Provisional application No. 62/316,214, filed on Mar. 31, 2016.

(51) Int. Cl.
  *E04H 15/64* (2006.01)
  *F16G 11/12* (2006.01)
  *E04F 10/06* (2006.01)

(56) References Cited

U.S. PATENT DOCUMENTS

| | | | | |
|---|---|---|---|---|
| 2,756,964 | A * | 7/1956 | Hogan | B66F 3/08 254/98 |
| 2,884,225 | A * | 4/1959 | Ford | E04H 17/268 254/231 |
| 3,371,671 | A * | 3/1968 | Kirkham | E04H 15/06 135/139 |
| 3,895,879 | A * | 7/1975 | Burtelson | E04C 5/122 403/369 |
| 4,157,171 | A * | 6/1979 | Hasselas | F16G 11/12 24/68 CT |
| 4,223,869 | A * | 9/1980 | Patterson, III | F16G 11/12 24/279 |
| 4,353,702 | A * | 10/1982 | Nagy | B63H 13/00 440/8 |
| 4,567,627 | A * | 2/1986 | Patterson, III | B61D 45/00 24/68 CT |
| 4,726,153 | A * | 2/1988 | Adler | E04H 15/34 135/88.13 |
| 4,942,895 | A * | 7/1990 | Lynch | E04H 15/26 135/114 |
| 5,000,211 | A * | 3/1991 | Speare | E04B 1/3441 135/100 |
| 5,036,874 | A * | 8/1991 | Lynch | E04H 15/26 135/905 |
| 5,148,640 | A * | 9/1992 | Reilly, Sr. | E04B 7/00 135/88.1 |
| 5,307,829 | A * | 5/1994 | Dalo | E04H 15/322 135/125 |
| 5,333,425 | A * | 8/1994 | Nickerson | E04H 15/18 160/383 |
| 5,345,962 | A * | 9/1994 | Moss | E04H 15/18 135/116 |
| 5,490,532 | A * | 2/1996 | Mallookis | E04H 15/50 135/114 |
| 5,566,701 | A * | 10/1996 | Grey | E04H 15/58 135/135 |
| 5,622,197 | A * | 4/1997 | Valaire | E04H 15/003 114/106 |
| 5,887,841 | A * | 3/1999 | Newberg | B63B 15/0083 114/102.12 |
| 6,213,138 | B1 * | 4/2001 | Wimpee | E04H 15/44 135/121 |
| 6,502,593 | B1 * | 1/2003 | Stafford | E04H 15/18 135/115 |
| 6,691,723 | B2 * | 2/2004 | Godbersen | E04H 15/64 135/120.2 |
| 6,814,094 | B1 * | 11/2004 | Barber | E04H 15/322 135/119 |
| 6,874,518 | B2 * | 4/2005 | Porter | E04H 15/46 135/119 |
| 6,877,261 | B2 * | 4/2005 | Milton | E04H 15/322 38/102.8 |
| 7,025,074 | B2 * | 4/2006 | Porter | E04H 15/46 135/119 |
| 7,175,162 | B1 * | 2/2007 | Ratcliff | B66D 3/18 212/174 |
| 7,198,253 | B2 * | 4/2007 | Striebel | E04F 11/1834 254/231 |
| 7,219,681 | B1 * | 5/2007 | Hamilton-Jones | E04H 15/322 135/119 |
| 7,392,816 | B2 * | 7/2008 | Porter | A45B 23/00 135/117 |
| 7,757,439 | B1 * | 7/2010 | Ranieri | E04H 15/322 52/222 |
| 7,814,921 | B1 * | 10/2010 | Ranieri | E04F 10/06 135/117 |
| 7,891,640 | B2 * | 2/2011 | Price | E04H 17/266 254/199 |
| 8,113,992 | B2 * | 2/2012 | Koehler | A63B 9/00 482/35 |
| 8,757,187 | B2 * | 6/2014 | Kiefer | F16C 11/0623 135/117 |
| 8,881,348 | B2 * | 11/2014 | Teranishi | F16G 3/006 24/68 CT |
| 8,991,413 | B2 * | 3/2015 | Arbeiter | E04H 15/64 135/119 |
| 9,062,462 | B2 * | 6/2015 | Michel | E04F 10/005 |
| 10,006,222 | B2 * | 6/2018 | Herman | B23K 31/02 |
| 10,184,265 | B2 * | 1/2019 | Pashandi | E04H 15/405 |
| 10,301,840 | B1 * | 5/2019 | Jin | F16H 31/001 |
| 2004/0261953 | A1 * | 12/2004 | Hart | E04B 7/14 160/80 |
| 2006/0163544 | A1 * | 7/2006 | Schlorff | F41H 11/12 254/231 |
| 2006/0175019 | A1 * | 8/2006 | Rewak | E04F 10/0648 160/67 |
| 2007/0028953 | A1 * | 2/2007 | Zanot | E04H 15/64 135/119 |
| 2007/0240746 | A1 * | 10/2007 | Chen | E04H 15/322 135/119 |
| 2009/0056781 | A1 * | 3/2009 | Stanley | E04H 15/60 135/122 |
| 2009/0301534 | A1 * | 12/2009 | Bettega | E04F 10/0648 135/96 |
| 2014/0209258 | A1 * | 7/2014 | Wenstrand | E04H 15/322 160/392 |
| 2014/0366922 | A1 * | 12/2014 | King | E04H 15/58 135/96 |
| 2016/0380415 | A1 * | 12/2016 | Howell | H02G 1/04 254/231 |
| 2017/0028412 | A1 | 10/2017 | Pena | |
| 2017/0284123 | A1 * | 10/2017 | Pena | E04H 15/322 |
| 2017/0363131 | A1 * | 12/2017 | Pena | E04H 15/322 |
| 2018/0195548 | A1 * | 7/2018 | Pena | E04H 15/18 |

* cited by examiner

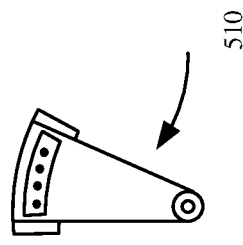
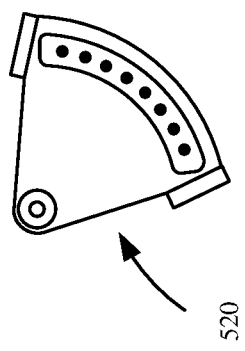
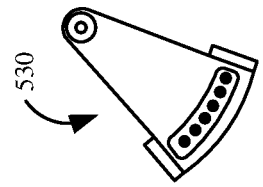
FIG. 5B
FIG. 5C
FIG. 5D
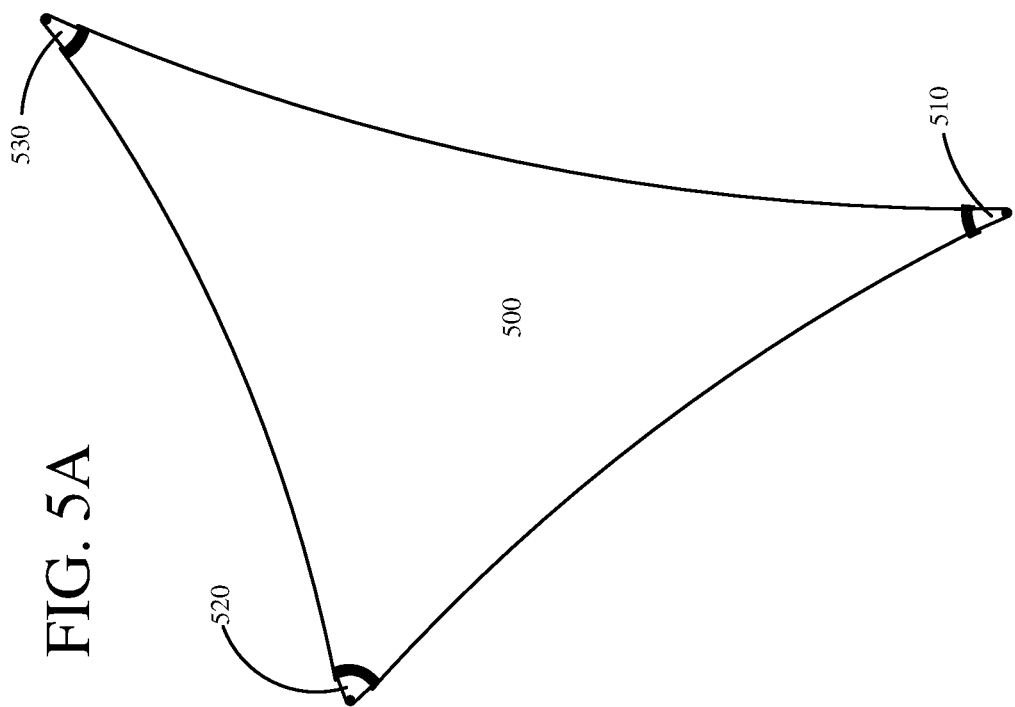
FIG. 5A

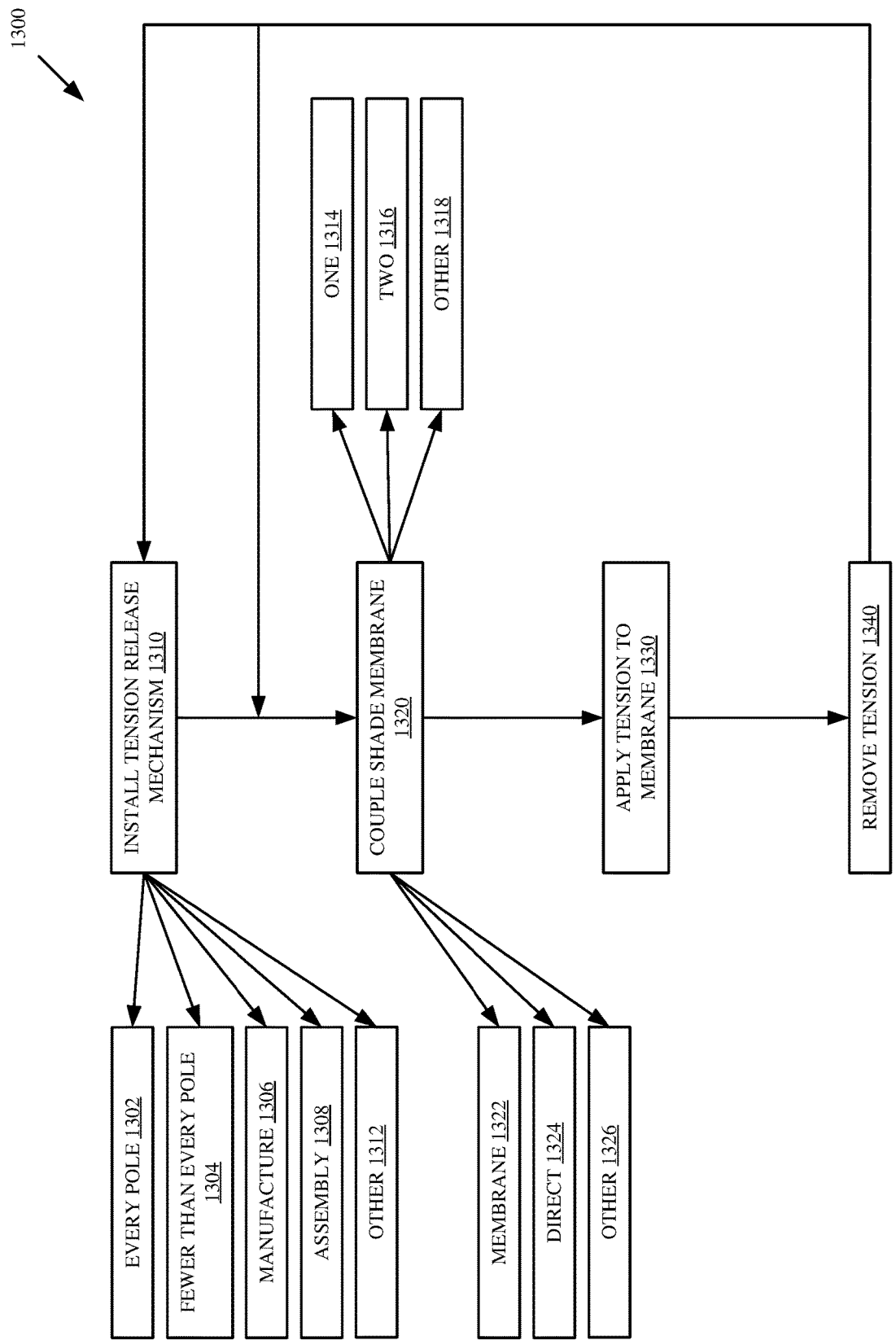

TENSION RELEASE SYSTEM

CROSS-REFERENCE TO RELATED APPLICATIONS

The present application is a continuation-in-part of, and claims the benefit of, U.S. Nonprovisional patent application Ser. No. 15/468,712, filed on Mar. 24, 2017, which claims the benefit of U.S. Provisional Patent Application Ser. No. 62/316,214 filed Mar. 31, 2016, the content of which application is hereby incorporated by reference in its entirety.

BACKGROUND

Shade structures are known and used in many outdoor settings for permanent or temporary protection from direct sunlight and/or other weather elements. A shade structure may consist of one or more membranes stretched over, or between, support structures. For example, in one embodiment a shade structure may comprise a shade membrane stretched between different support poles.

SUMMARY

A method of installing a releasable shade membrane to a shade system is presented. The method comprises installing a tension release system within a structural component of the shade system. The tension release system comprises a threaded member configured to, when actuated, cause a coupling mechanism to move along an axis defined by the threaded member. The method also comprises coupling a shade membrane to the coupling mechanism. The method also comprises actuating the threaded member in a first direction, such that the coupling mechanism moves along the axis in a tensioning direction. The tension release system is configured to release applied tension upon actuation of the threaded member in a second direction, causing the coupling mechanism to move along the axis in a release direction. The release direction is substantially the reverse direction of the tensioning direction.

BRIEF DESCRIPTION OF THE DRAWINGS

FIGS. 5A-5D illustrate example shade membrane element components for a shade structure in accordance with an embodiment of the present invention.

FIG. 13 illustrates one example of a method of installing a shade structure with a multi-membrane tension coupling mechanism.

DETAILED DESCRIPTION OF ILLUSTRATIVE EMBODIMENTS

Shade structures are common features in playground construction and design. A shade structure can be any one of a plurality of different configurations—for example, stretched over a support frame, like an umbrella, or a taut structure coupled between support elements, such as a series of columns. Many shade structures are designed to be permanent installations in outdoor environments, for example within a playground area. However, it is increasingly desired for shade structures to be at least semi-removable, for example, such that shade membranes can be removed and stored in anticipation of a weather-related. Some shade membranes, for example, are not designed to withstand significant snowfall, and are taken inside for the winter. Additionally, shade membranes may need to be brought down in advance of high wind situations, for example tornadoes and/or hurricanes. Therefore, it is increasingly desired that shade structures be constructed such that the shade membranes are more easily removable. At least some embodiments described herein illustrate shade membranes with tension release systems, configured to more easily couple a shade membrane to a column, and also to aid in the removal of the shade membrane.

As described herein, a shade membrane comprises any material configured to be stretched between, or over a support structure, and provide at least some protection from sunlight. Such membranes may comprise, for example, cloth, fabric, a polymeric material, plastic, metal, or another suitable material. However, in other embodiments, shade membrane can also comprise a clear material, for example designed only to provide protection from weather elements, such as rain, but configured to allow a viewer to at least partially see through the material. Other appropriate materials are also envisioned herein. Therefore, at least some embodiments described herein relate to substantially durable shade structures that can be assembled and taken down as needed, but can also withstand substantially year-round exposure to weather-related elements in at least some climates.

Figure 1:
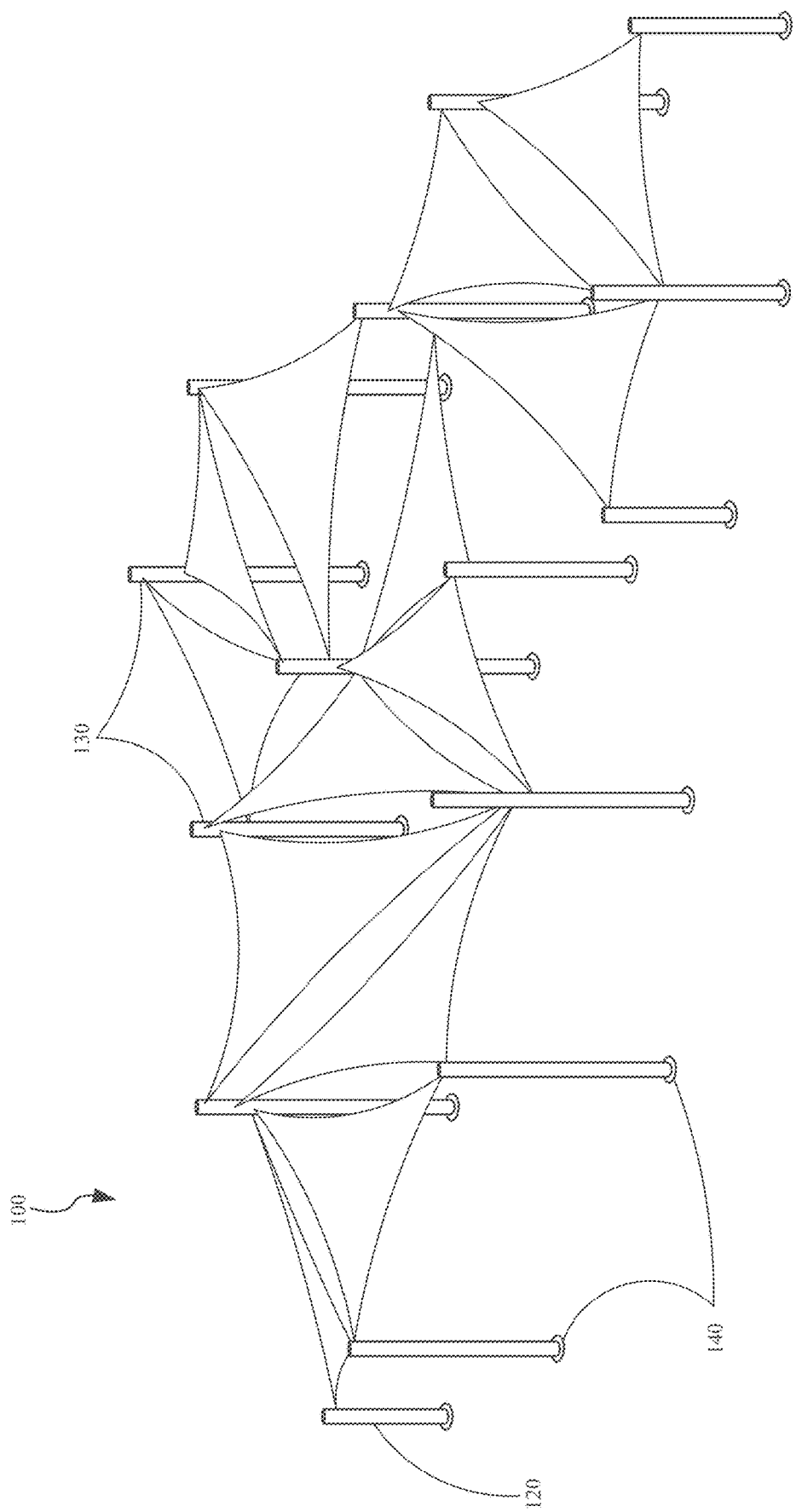
FIG. 1 is an example shade structure in a playground environment in which embodiments of the present invention may be useful.

FIG. 1 is an example shade structure in a playground environment in which embodiments of the present invention may be useful. FIG. 1 illustrates an extended shade structure 100 comprising a plurality of membrane elements 110 stretched between columns 120. Columns 120, in one embodiment, are configured for permanent installation within an outdoor environment at installation points 140. Permanent installation may comprise at least a portion of the column extending below a ground surface. Columns 120 are configured to couple to one or more shade membranes at coupling points 130.

As illustrated in FIG. 1, multiple shade elements may extend from a single column, and each shade element may be configured to couple one or more columns. While FIG. 1 illustrates three-cornered shade membrane elements, it is also envisioned that more or fewer points could be used, for example only two points coupled to columns and a third point coupled to a ground, four pointed structures, five pointed structures, etc. As illustrated in FIG. 1, in one embodiment, shade membrane elements 110 are configured to stretch, or be pulled taut, under an applied tension. In at least one embodiment, shade membrane elements 110 are configured to have some flexibility, enabling them to be stretched between columns 120. However, in one embodiment, shade membrane elements 110 are sufficiently rigid and configured to withstand tension. However, as the tension may cause shade membrane elements 110 to wear over time, it is desired to be able to easily remove each individual shade membrane element 110, from a connection point 130 on a column 120, such that repair or replacement can be conducted.

Figure 2:
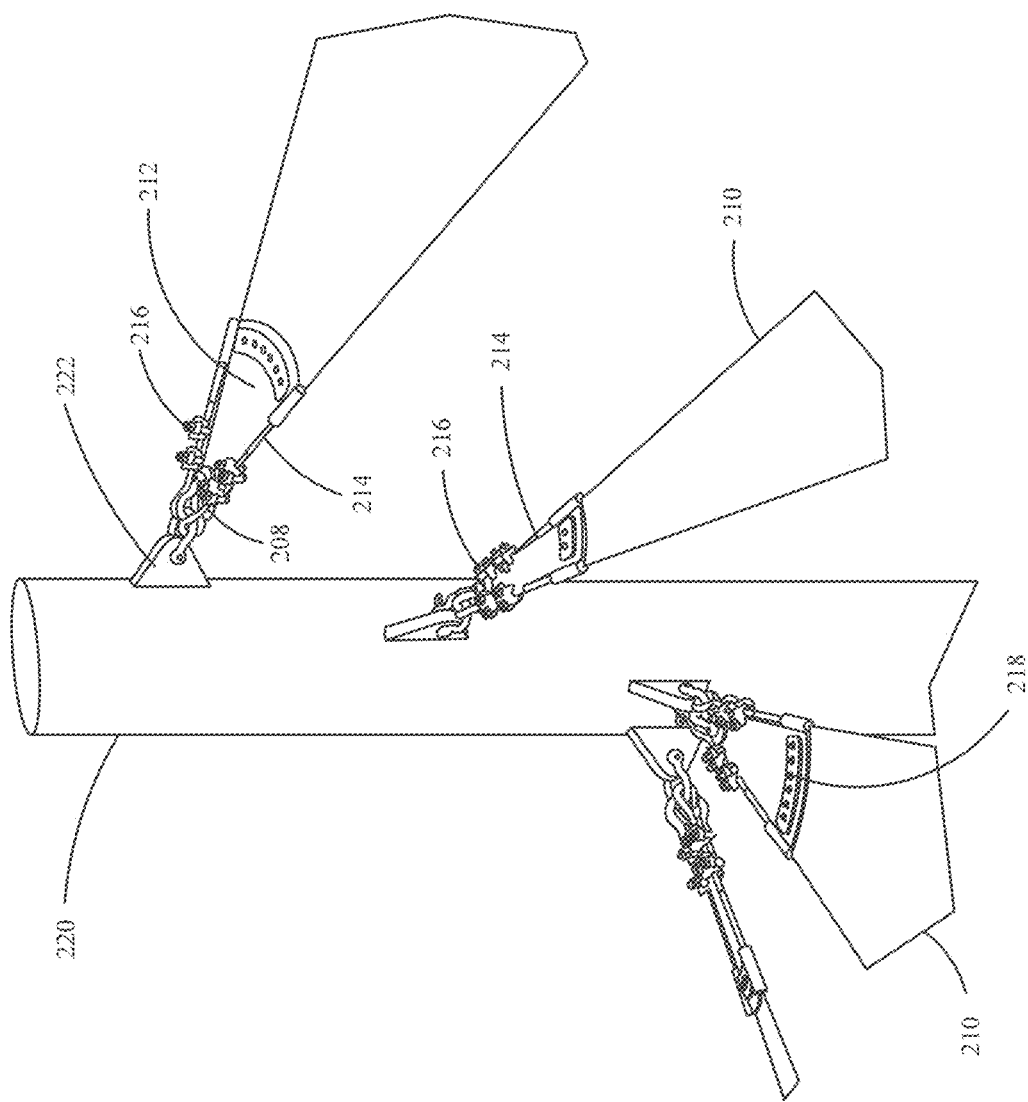
FIG. 2 is an isolated view of a column coupled to a plurality of shade elements in accordance with an embodiment of the present invention.

FIG. 2 is an isolated view of a column coupled to a plurality of shade elements in accordance with an embodiment of the present invention. View 200 illustrates a column 220 configured to couple to a plurality of shade elements 210. Each shade element 210 is coupled to a membrane plate 212, in one embodiment, by a series of fasteners 218. In one embodiment, the membrane plate 212 comprises a steel plate, coupled by bolts 218, to shade element 210 at a plurality of points. In one embodiment, membrane plate 212 is configured to couple to shade element 210 at multiple coupling points (illustrated by fasteners 218), such that tension is spread across the membrane, reducing a risk of tearing from a single fastener 218.

In one embodiment, shade elements 210 also comprise one or more internal cables 214, coupled to membrane plate 212 by one or more cable fasteners 216. In one embodiment, cables 214 comprise steel cables, and cable fasteners 216 comprise cable clamps. Cables 214, in one embodiment, are configured to be adjustable such that another source of tension can be applied and released to each shade element 210. In one embodiment, cables 214 comprise a square-shaped thread. In another embodiment, cables 214 comprise ACME thread.

Shade element 210, in one embodiment, couples to column 220, using a coupling feature 222. Coupling feature 222 is coupled to membrane plate 212 by a coupling mechanism 208, as illustrated in FIG. 2. In one embodiment, coupling feature 222 is attached to shade element 210 prior to its installation to the column 220. However, in another embodiment, coupling feature 222 is coupled to column 220 as part of an installation process. In one embodiment, coupling feature 222 comprises one or more clevises. Shade elements 210 are described herein as coupling to a column 220 through the use of a membrane plate 212. However, in at least some embodiments, shade elements 210 couple to a coupling feature 222 directly, without an intervening membrane plate 212.

It is to be understood that features shown in FIG. 2 are illustrative only, and other appropriate constructions could also be used. For example, connection feature 222 is illustrated as a support tab, however the triangular shape illustrated in FIG. 2 could also be a square feature, or a rounded feature, and other embodiments.

FIGS. 3A-3D illustrate a plurality of views of a coupling between a shade membrane and a column in accordance with a first embodiment of the present invention. As described herein, a plurality of different coupling mechanisms between a shade element and a column are possible. It is desired that a coupling mechanism enable easier attachment of the shade mechanism to the column, while also allowing for a quick release when necessary. FIGS. 3A-3D illustrate a coupling 300, between a column 320 and a shade membrane 310 that is accomplished through the use of a rod 340 (shown clearly in FIG. 3C).

Figure 3A:
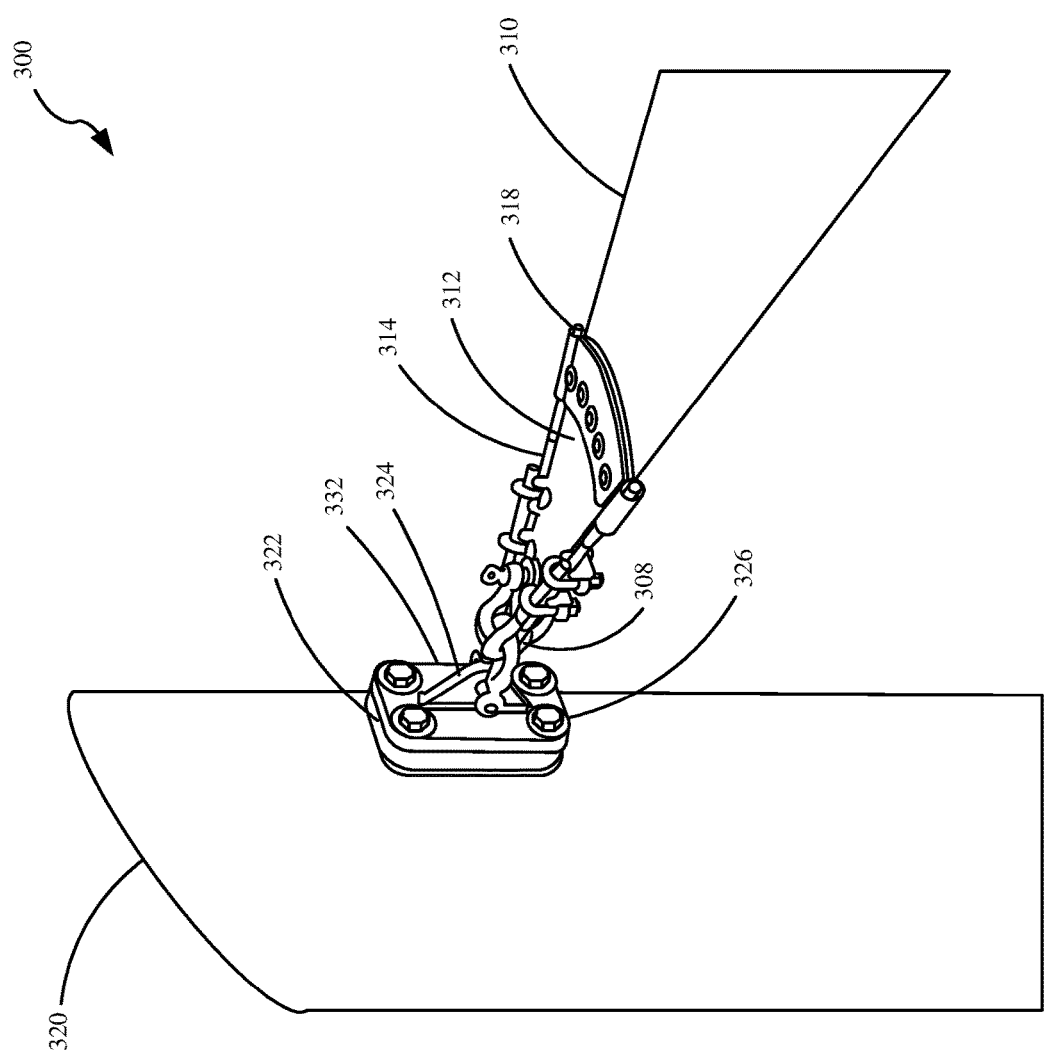
FIGS. 3A-3D illustrate a plurality of views of a coupling between a shade membrane and a column in accordance with a first embodiment of the present invention.

FIG. 3A illustrates a shade membrane 310 fastened to a column 320, Shade membrane 310 is coupled to a shade membrane plate 312 by a series of shade membrane fasteners 318. Shade membrane plate 312 is coupled to a membrane coupling plate 332 by a coupling mechanism 308. In one embodiment, membrane coupling plate 332 is attached to membrane plate 312 prior to coupling, e.g., prior to shade membrane 310 being drawn towards column 320. Membrane coupling, plate 332 is configured to couple to a column coupling plate 322 by a series of fasteners 326. As illustrated in FIG. 3A, in one embodiment, membrane coupling plate 332 and column coupling plate 322 are rectangularly shaped, and configured such that four fasteners 326 are used. However, other shapes may also be envisioned for coupling plates 332 and 322, such that at least two fasteners 326 are used. However, more fasteners 326 may also be used, in other embodiments, for example 5, 6, 8, etc. Additionally, other suitably shaped coupling plates 332 and 322 are also envisioned, for example circles, trapezoids, pentagons, etc. Additionally, in at least some embodiments, shade membrane 310 couples to column 320 without a membrane plate 312. For example, in one embodiment, shade membrane 310 couples to membrane coupling plate 332 directly.

In one embodiment, connection of shade membrane 310 to column 320 is accomplished as membrane 310 nears column 320. Connection of shade membrane 310 to column 320 is facilitated, in one embodiment by rod 340 acting as a guide.

Figure 3B:
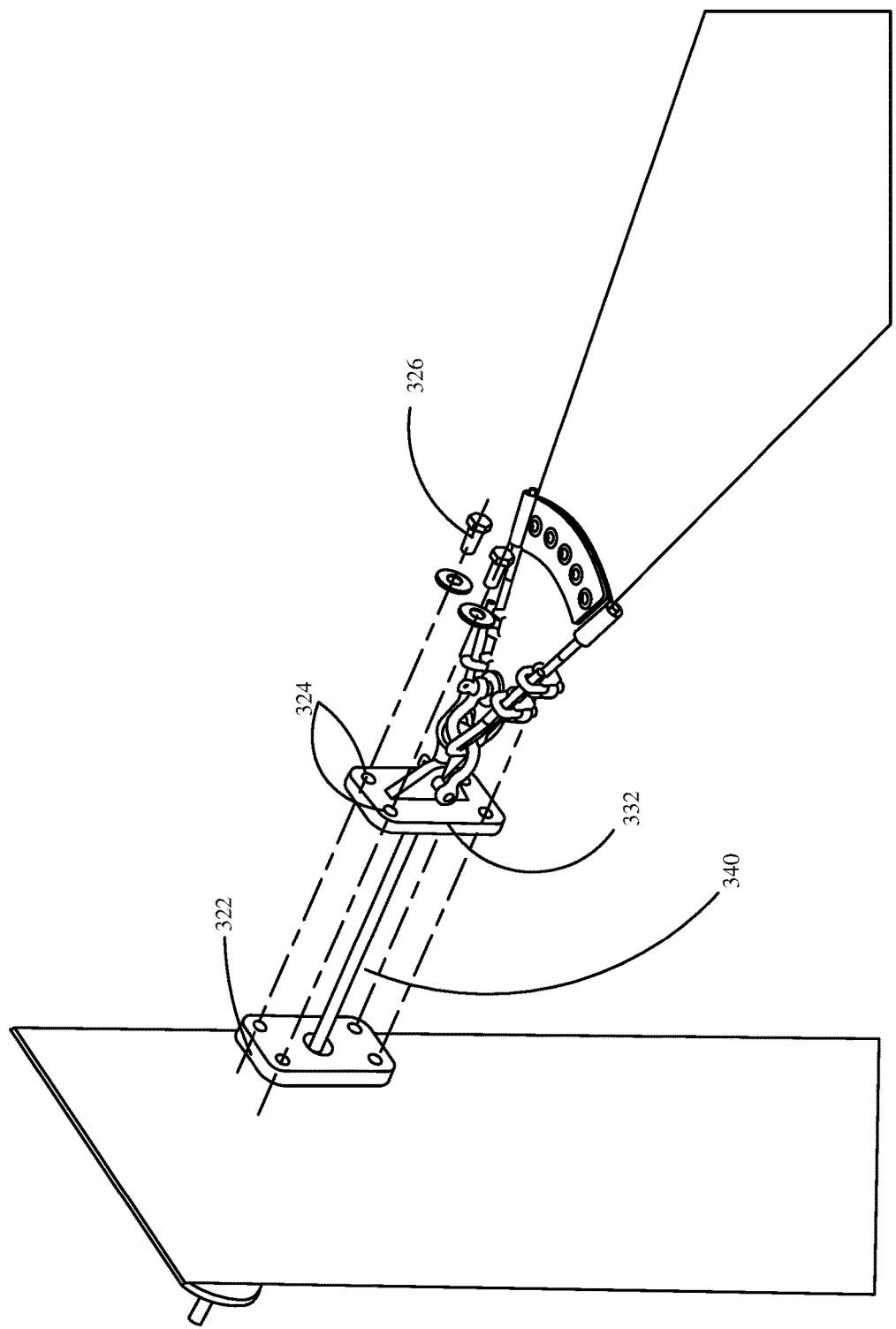
Figure 3C:
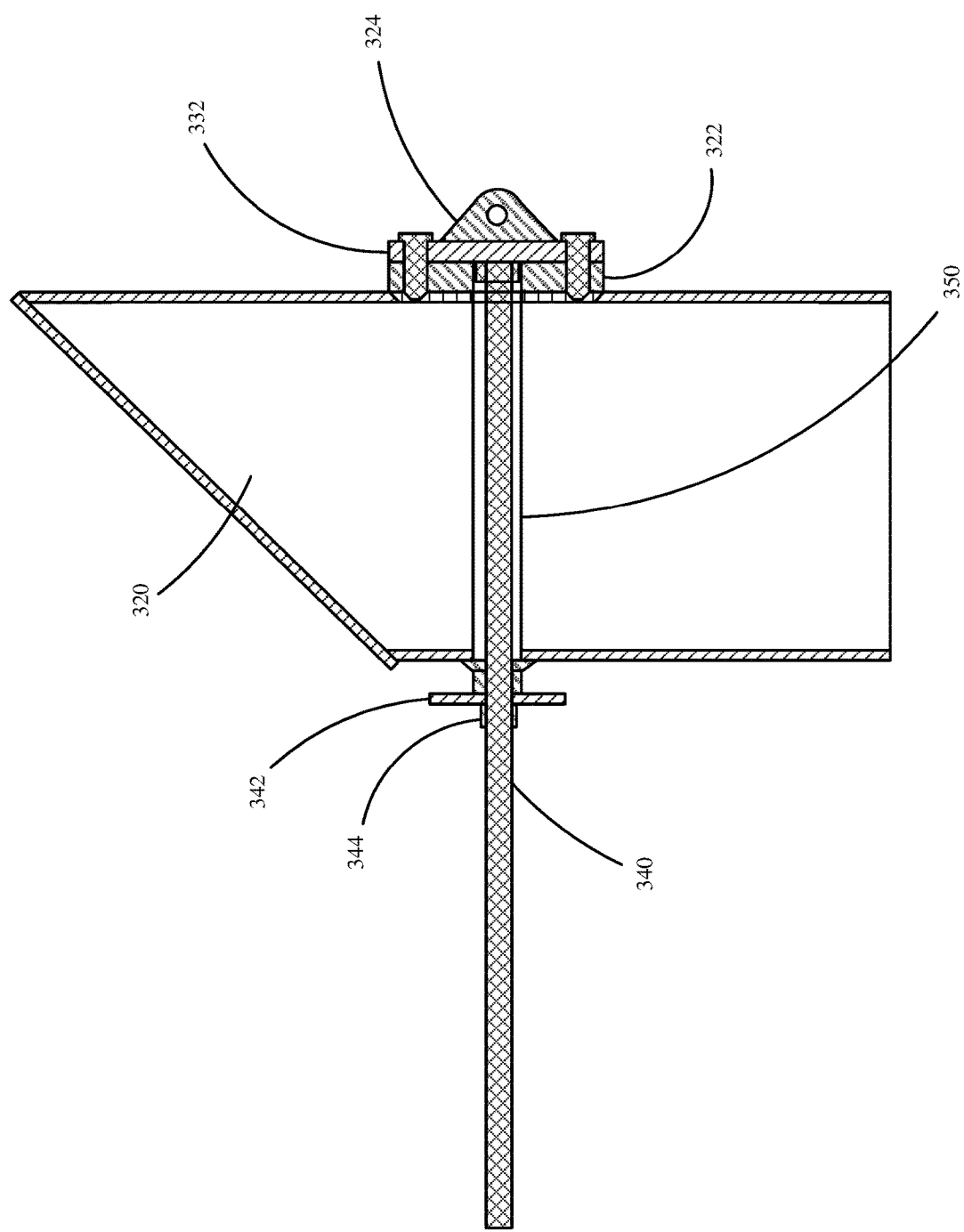
Figure 3D:
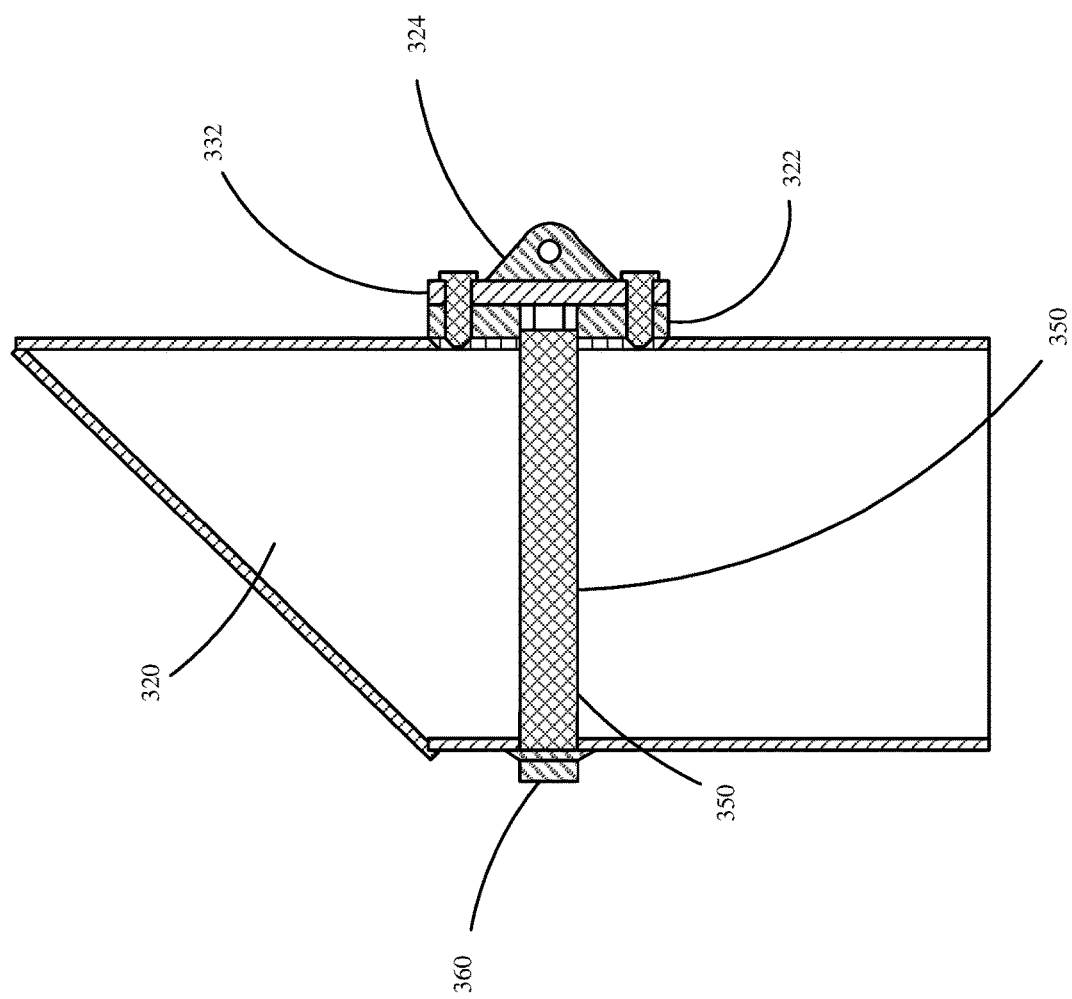

FIG. 3B illustrates an exploded view of a coupling between a shade membrane and a column. Membrane coupling features 324, attached to membrane coupling plate 332 is drawn towards column coupling plate 322 by a rod 340, in one embodiment. Use of a rod 340 allows for an installer to draw shade membrane 310 towards column 320 and facilitate a coupling. Additionally, in one embodiment, use of rod 340 ensures that coupling plates 322 and 332 are drawn together in aligned position, such that fasteners 326 are more easily applied. In one embodiment, the use of rod 340 may reduce difficulty in accommodating a stretching of shade membrane 310 during installation. Rod 340 may couple to membrane coupling plate 332, and extend all the way through column 320, such that an installer can actuate rod 340 to draw shade membrane 310 towards column 320. In one embodiment, actuating rod 340 comprises pulling. In another embodiment, rod 340 is a threaded rod, such that rotational actuation translates to a linear movement of rod 340 through column 320. Once shade membrane 310 is aligned with column 320, for example as illustrated in FIGS. 3A, 3C and 3D, fasteners 326 are applied, and, rod 340 can be removed. When it is time to decouple shade membrane 310 from column 320, rod 340 can be reinserted through column 320 to allow for stability during removal. In one embodiment, alignment comprises coupling plates 322, 332 positioned such that fasteners 326 are receivable at desired, fastening points, FIG. 3C illustrates a cross-sectional view of a shade membrane 310 fastened to a column 320. For ease of illustration, in FIGS. 3C and 3D shade membrane 310 and membrane plate 312 are removed. However, it is to be understood, that at least in one embodiment, membrane plate 332 and membrane attachment features 324 are not installed to the column without being first attached to membrane 310 by membrane plate 312. As illustrated in FIG. 3C, an internal sleeve 350 is used to allow for rod 340 to extend through column 320 to couple to membrane coupling plate 332. In one embodiment, rod 340 comprises an ACME, rod 349 extending through an ACME nut 344, and a washer 342.

FIG. 3D) illustrates a cross-sectional view of an installed shade membrane. When installed, rod 340 is removable from the installation area, and a cap 360 can be applied, such that internal sleeve 350 is not readily accessible. In one embodiment, cap 360 is configured to obscure internal sleeve 350 in order to deter vandalism and to maintain the safety of users.

Many shade structures are designed such that a membrane is under tension when installed. However, previous shade structure designs put a shade membrane under tension using special come-alongs and straps in order to draw membrane close to a shade structure for a connection. Use of such methods can require cranking, and result in a less smooth tension application than achievable using a threaded drive mechanism. This can be difficult in ideal situations, and even more difficult under non-ideal situations (for example, in a windy environment), which could even cause damage to a membrane, support structures, or individuals setting up or taking down a shade membrane. Often, a shade membrane needs to be taken down when a weather situation becomes severe. Therefore, installation and removal systems need to work under non-ideal situations, for example in high winds, or hurricane situations, or while snow is falling. Use of embodiments described herein allow for a connection assembly to function without cabling or pre-stretching of the shade element.

Connection assemblies, those illustrated in FIG. 3, as well as those described with respect to FIG. 7, may allow for tightening of the membrane without significant, or specialized, additional equipment. In one embodiment, when in proximity of a column, or other support structure, rod 340 can extend through column 320 allowing for easy coupling of shade membrane 310 to column 320. Rotation of nut 344 pulls membrane coupling plate 332 into contact with column coupling plate 322, achieving operational tension without significant difficulty.

Removal of shade membrane 310 from column 320, in one embodiment, can be accomplished using the same steps in reverse, e.g. by rotating nut 344 about rod 340 in an opposing direction, causing shade membrane 310 to move away from column 320. In one embodiment, internal sleeve 350 comprises a threaded structure, configured to receive rod 340. The use of rotational force on nut 344 to rod 340, may assist in installation, by offering an installer greater control than a configuration requiring an operator to pull shade membrane 310 directly into contact with column 320. Once fasteners 326 are removed, actuation of rod 340 decouples coupling plates 322 and 332, causing shade membrane 310 to move away from column 320 in a controllable motion.

The terms column and support structure are used herein to refer to permanent, or semi-permanent, outdoor structures to which shade membranes can be coupled. While a column is one illustrative example of a support structure, it is also to be understood that other support structures are also envisioned. For example, shade membranes could also be coupled to platforms, walls, arches, or any other suitable support structure configured to support the tension applied to a shade membrane, and configured for durability in an outside environment.

Figure 4A:
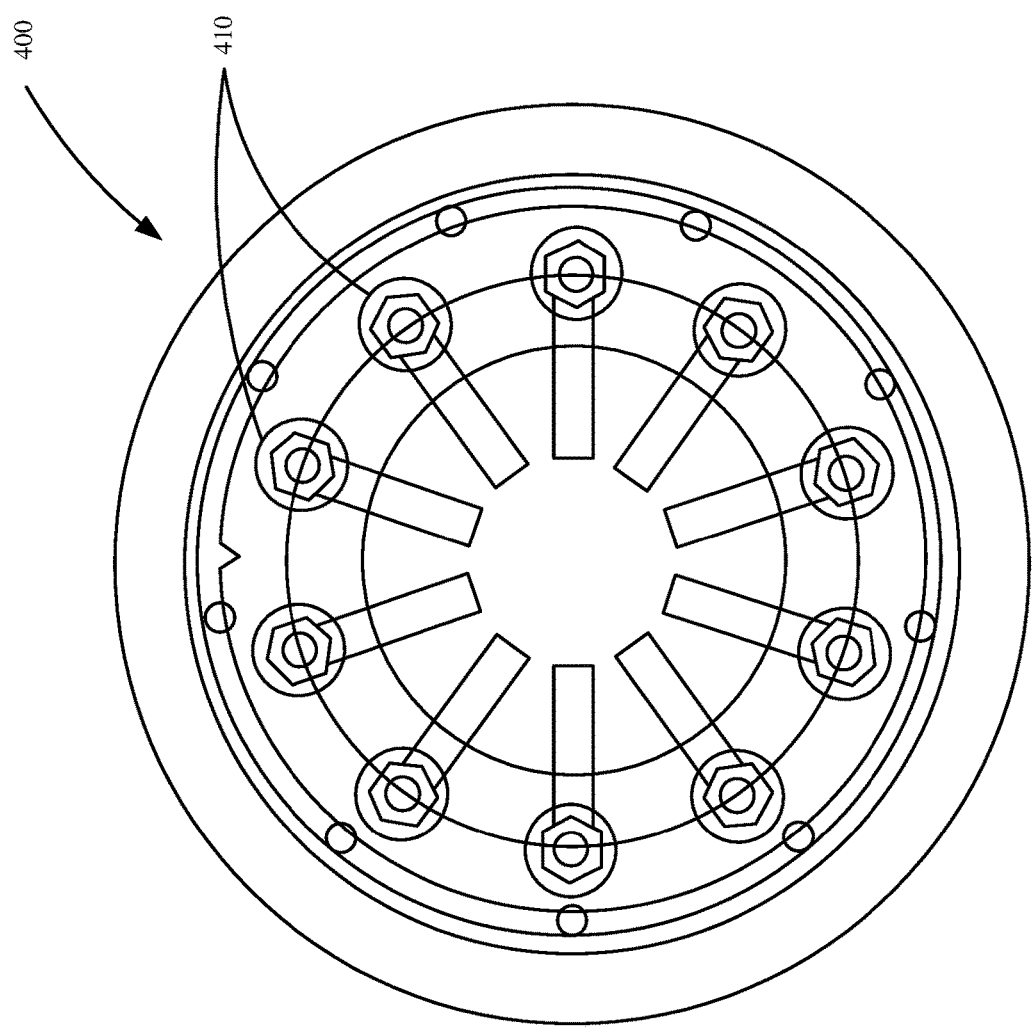
FIGS. 4A and 4B illustrate example column configurations for a shade structure in accordance with an embodiment of the present invention.
Figure 4B:
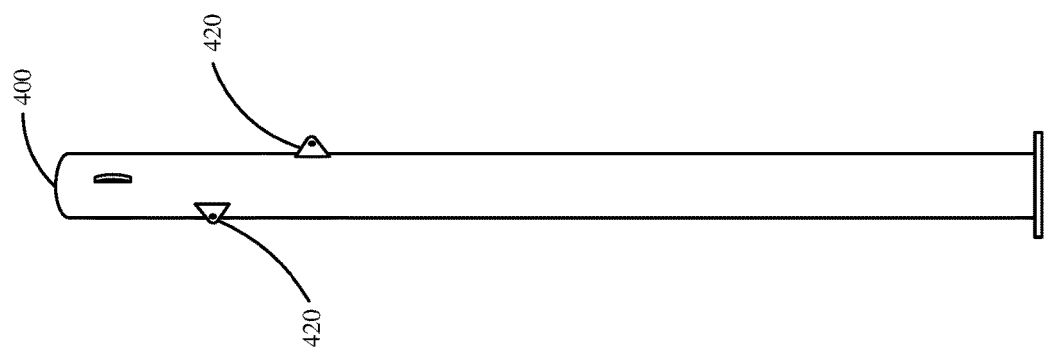
Figure 4B:
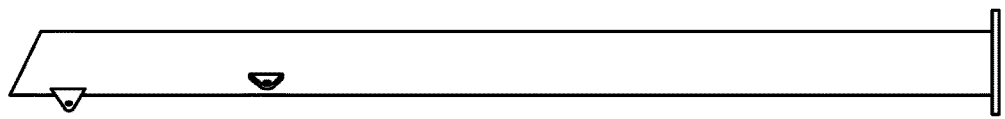

FIGS. 4A and 4B illustrate example column configurations for a shade structure in accordance with an embodiment of the present invention. Column 400, in one embodiment, comprises a plurality of foundational anchors 410. In one embodiment, foundation anchors are configured to extend substantially along an entire length, including a below-ground portion of a support structure 400. In one embodiment, foundational anchors 410 are spaced evenly along a perimeter of column 400. While described and illustrated herein are a plurality of columns used to support structures, it is to be understood that additional shapes could also be used, for example square, rectangle, or other suitably shaped configurations. In one embodiment, support structure 400 comprises a 10-inch column with a below-ground installation portion. It is also to be understood that foundation anchors 410 can also be positioned along sides, or in corners of other shapes, for example of rectangular prisms or throughout a pyramidal structure, or within curved poles, which may be used to facilitate an umbrella, or dome-shaped structure. These, and other support structure configurations 400 are also envisioned.

FIG. 4B illustrates an installed shade structure system, with shade membranes removed for ease of understanding. As illustrated in FIG. 4B, foundation anchors 410 may facilitate connection of shade membranes at different heights along the length of column 400, and different points about the perimeter of column 400, as illustrated by connection points 420.

Shade membranes are known in the art. Shade membranes, in one embodiment, are formed of any suitable material, including fabric materials as well as polymeric materials. For example, in one embodiment, a shade membrane comprises a fabric such as a polyester or a cotton. In one embodiment, a polymer is used. In other embodiments, a shade membrane comprises a mix of multiple types of materials.

Shade membrane materials may be configured to at least partially block sunlight in one embodiment. In another embodiment, shade membrane materials are configured to block a portion of UVA and/or UVB wavelengths of light. In one embodiment, shade membranes comprise one or more corners, configured to be couple to a support structure. In one embodiment, shade membranes couples to a support structure, through a connection assembly that comprises a membrane plate sized to fit the curvature and/or shape of the shade membrane corner. In another embodiment, a membrane plate is sized to fit the curvature of a round shade membrane, such that a shade structure can be installed with a round membrane shape.

FIGS. 5A-5D illustrate example shade membrane element components for a shade structure in accordance with an embodiment of the present invention. Shade element 500, as illustrated herein, can comprise a three-cornered polygon with concave sides, in one embodiment. However, it is to be understood that other shapes and sizes are also possible, and shade element 500 is only one illustrative example of possible shade element configurations that could be used in accordance with embodiments of the present invention.

As illustrated in FIG. 5A, shade membrane element 500 has three corners configured to couple to support structures, such as columns 400, in one embodiment. Corners 510, 520, and 530 are all different sizes, and comprise different angles.

Therefore, in one embodiment, each corner is paired with a different sized membrane plate. Membrane plates 512, 522, and 532, can be installed to a shade element 500, at corners 510, 520 and 530, respectively, prior to installation. For example, in one embodiment, membrane plates 510, 520, and 530 are installed on a shade element 500 during manufacture, prior to delivery at an installation site. However, in another embodiment, shade element 500 may be delivered as a kit with membrane plates 512, 522, and 532, to be assembled during an installation process. However, while shade membrane element 500 is illustrated with a membrane plate on each of corners 510, 520, and 530, in at least some embodiments, some corners are configured to couple to a column without the use of a membrane plate. For example, in one embodiment, only one, or only two of corners 510, 520 and 530 are coupled to a membrane plate. Additionally, in one embodiment, shade membrane element 500 is utilized without membrane plates on any corners.

FIGS. 5B, 5C, and 5D illustrate close-ups views of membrane plates 512, 522, and 532 respectively. Each of membrane plates 512, 522, 532, in one embodiment, comprises a plurality of fastening locations 540, configured to couple to membrane 500, as well as to a connection assembly 542 which can be used to couple shade membrane element 500 to a column, or other suitable support structure. Each of membrane plates 512, 522 and 532 may also comprise, in one embodiment, a cable coupling mechanism 544, configured to receive a cable. In one embodiment, membranes 500 are configured to be removable, such that they can be taken down to avoid damage due to weather, or taken down for cleaning and/or repair. A shade structure may comprise a single shade element 500 coupled to one or more support structures. However, in other embodiments, a plurality of shade elements 500 are configured to be coupled between a series of support structures. Additionally, it is also envisioned that, in some embodiments, shade element 500 only comprises membrane plates on a subset of corners, such that other mechanisms are used to couple shade element 500 to other structures. For example, in one embodiment, only a subset of support structures are coupled to shade element corners, and other corners are coupled using other mechanisms.

FIGS. 6A-6E illustrate an example installation sequence of a shade structure in accordance with an embodiment of the present invention. Shade structures can be installed in a plurality of environments and climates. However, shade structures are often installed at a distance above the ground, and, therefore, present some difficulty and danger to installers. Connection mechanisms described herein enable shade membrane elements to be coupled to support structures in an easier fashion than previous designs, and may require the use of fewer installers, and reduce overall installation time.

Figure 6A:
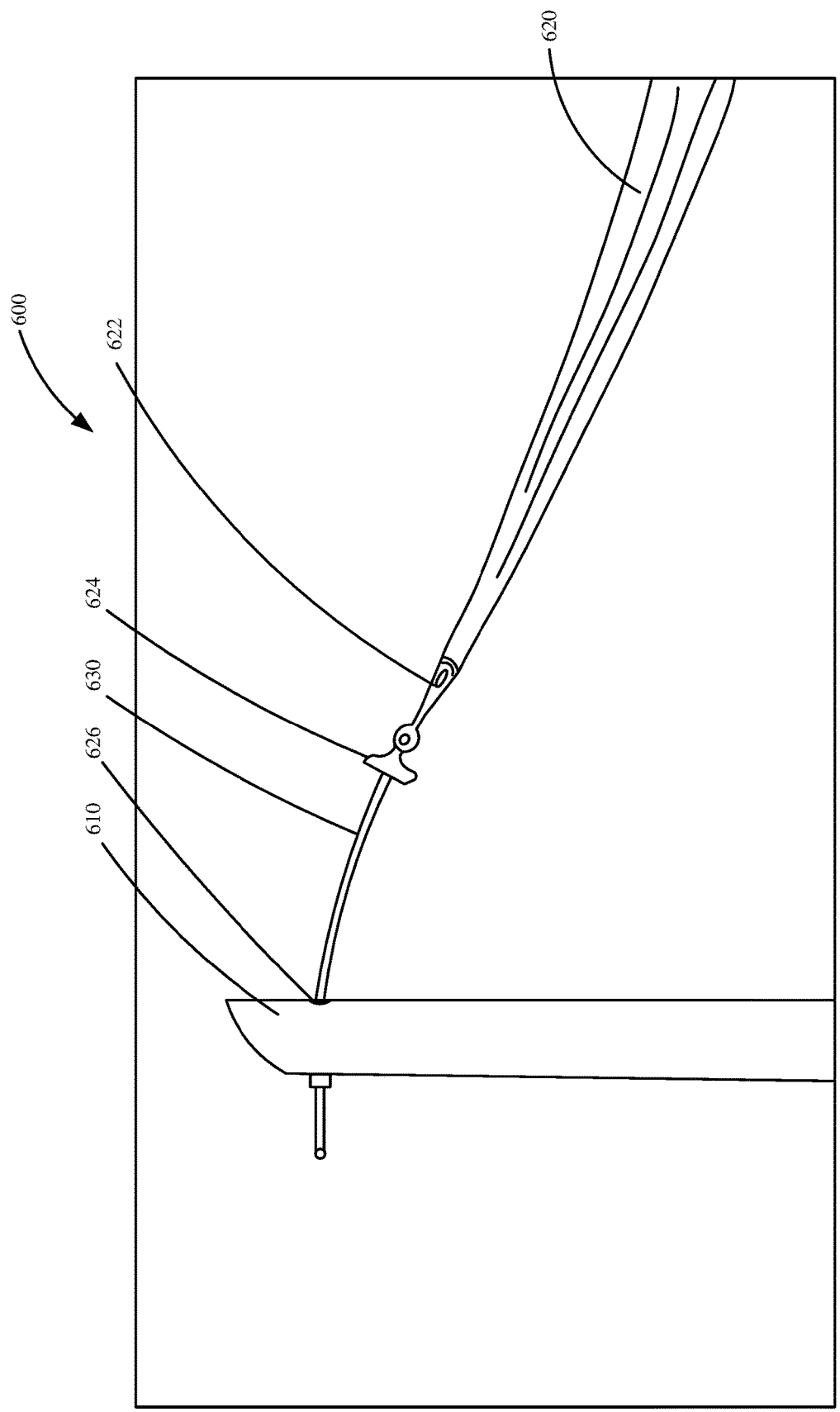
FIGS. 6A-6E illustrate an example installation sequence of a shade structure in accordance with an embodiment of the present invention.

FIG. 6A illustrates a view 600 of a shade membrane element 620 being drawn towards a column 610 for installation. Often, shade membrane elements 620 must be placed under tension during installation, which may require drawing a shade membrane element 620 towards a column 610 such that shade membrane element 620 stretches. While shade membranes can be designed to flex and stretch, coupling a shade membrane element 620 to a column 610 such that it is pulled taut often requires specialized tools, and can require multiple installers to work together for sufficient control over a coupling process.

In one embodiment, as illustrated in FIG. 6A, a tensioning rod 630 is used. Tensioning rod 630 may extend completely through the diameter of column 610, in one embodiment, and couple to shade membrane coupling plate 624. Actuation of tensioning rod 630 may draw shade element 620, and shade membrane coupling plate 624, towards a coupling assembly plate 626 mounted on column 610. Actuation, in one embodiment, comprises rotation of rod 630, which may be threaded. The use of a rotational force on a nut allows for conversion of the rotational force to linear movement of threaded rod 630, which can allow for better control, and easier installation of membrane element 620 as opposed to a direct pulling force on rod 630, or plate 624 directly.

Figure 6B:
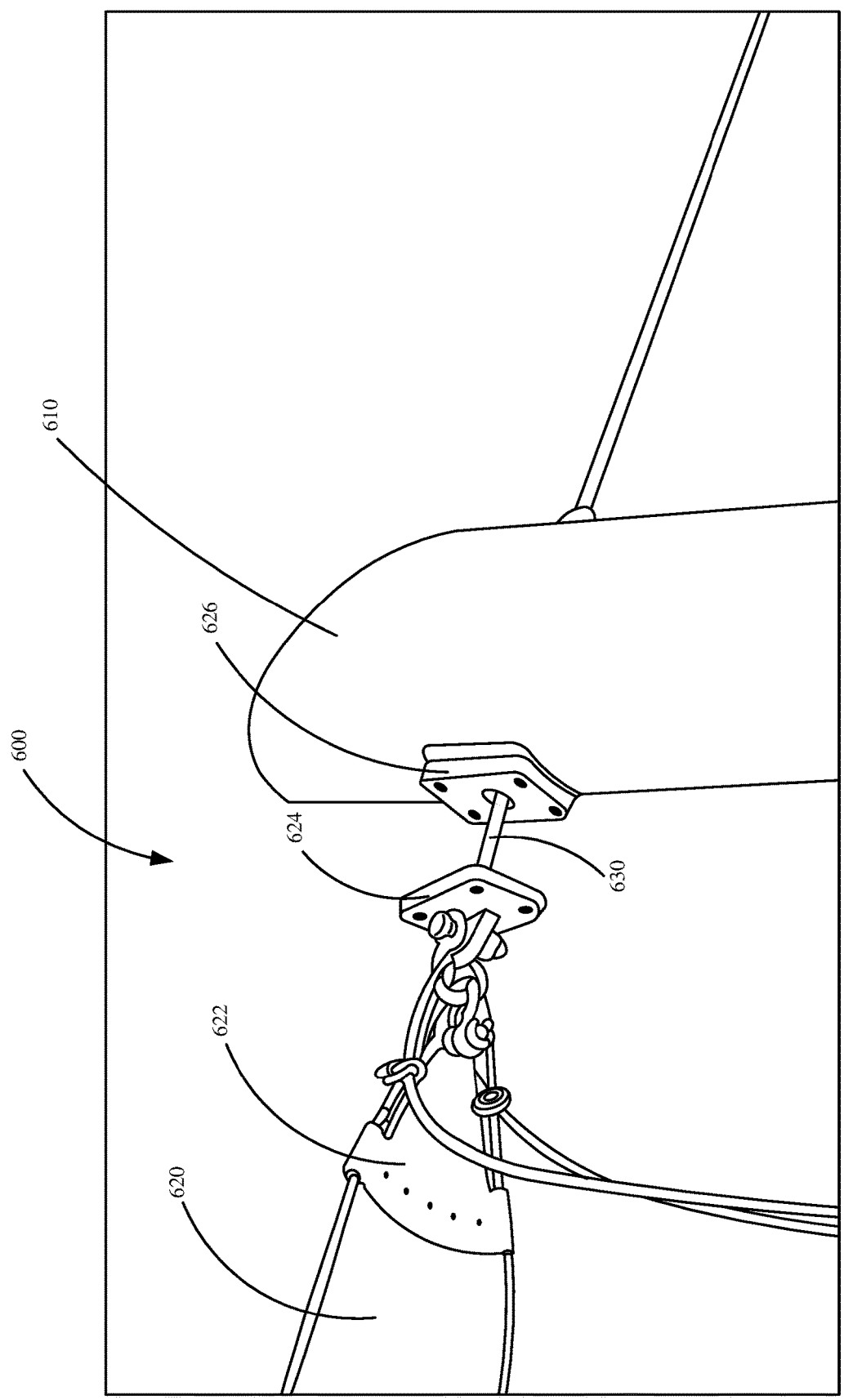
Figure 6C:
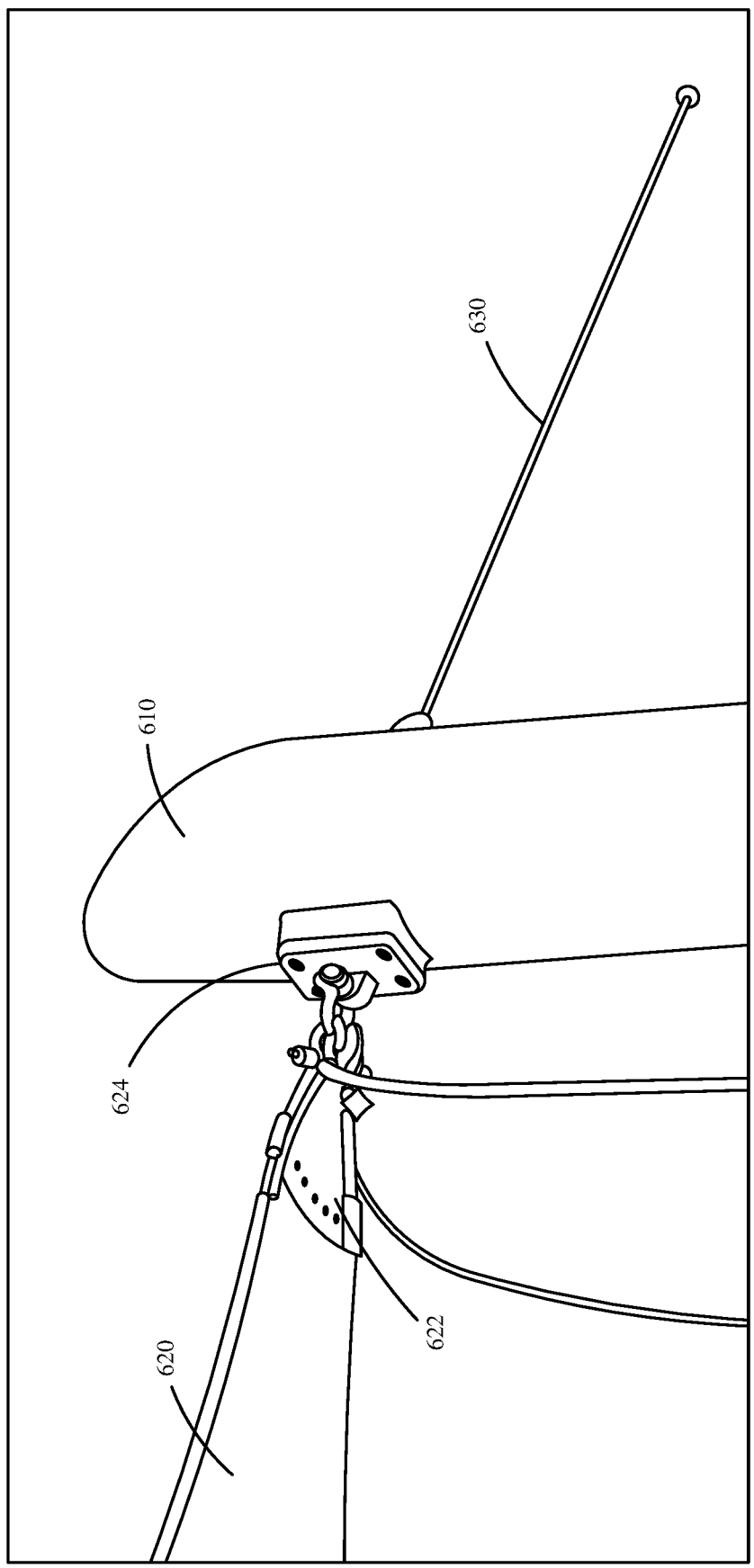

FIG. 6B illustrates a view of a shade membrane element nearing a coupling point on a column. As tensioning rod 630 is actuated, shade membrane element 620 nears column 610. Shade element 620, coupled to shade membrane 622 which, in turn, is coupled to shade element coupling plate 624, nears an installation assembly 626 on a column 610. As illustrated in FIG. 6B, each of coupling plates 624 and 626 have fastener receiving portions configured to receive fastener 628 (shown in FIG. 6D), to complete a coupling. As illustrated in FIGS. 6B-6C, one advantage of using a tensioning rod 630 is that, as coupling plates 624, 626 are drawn together, they will be in an aligned position, such that fasteners 628 (shown in FIG. 6D) can be easily attached.

FIG. 6C illustrates a view of a shade membrane element being tightened to a column. Actuation of tensioning rod 630 will bring membrane coupling plate 624 into alignment with column coupling plate 626. In one embodiment, this allows for shade membrane element 620 to more easily be pulled taut during the connection process to column 610.

Figure 6D:
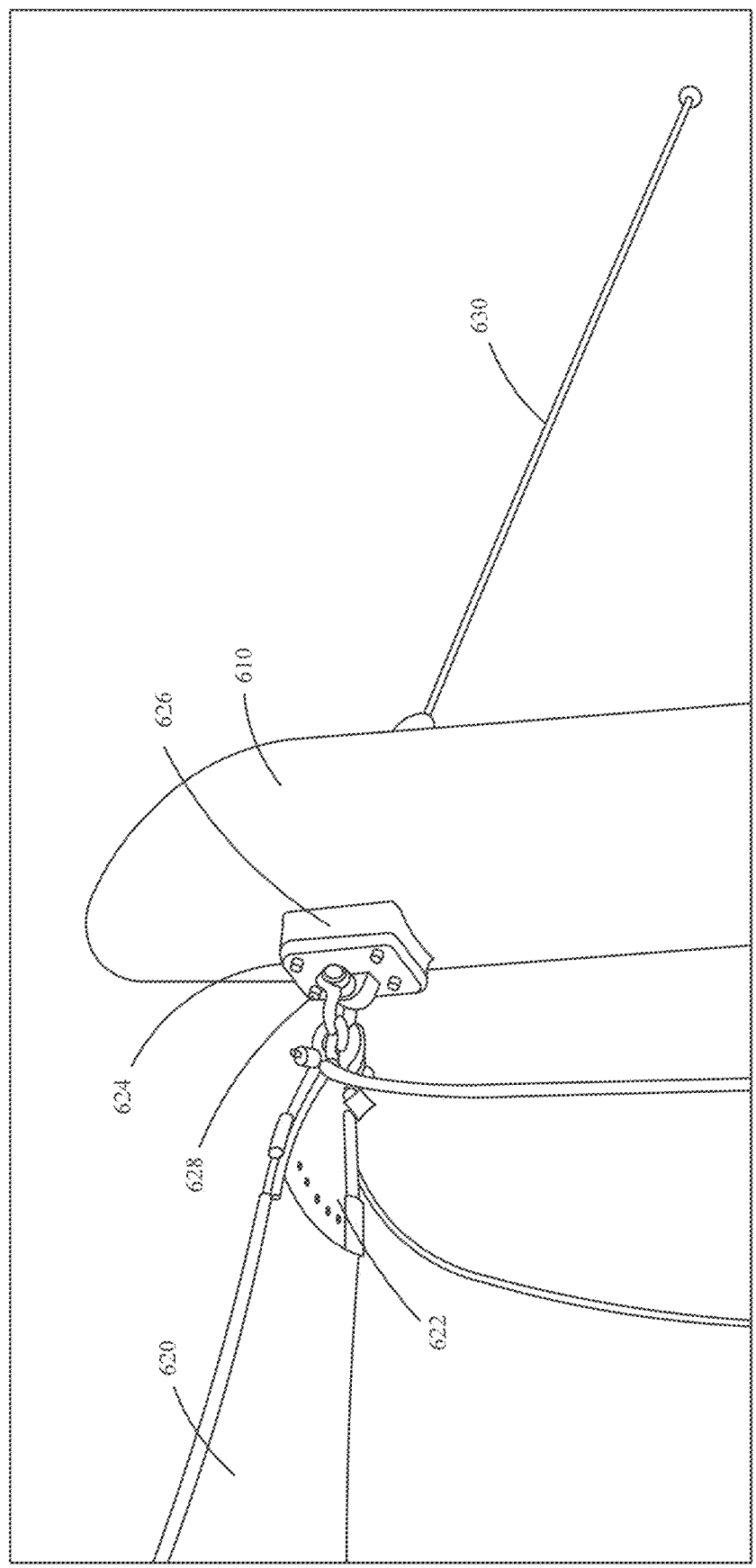

FIG. 6D) illustrates a shade membrane element 620 fastened to a column by one or more fasteners 628. Once coupling plates 624 and 626 are directly fastened together, as illustrated in FIG. 6D, tensioning rod 630 is no longer needed to maintain shade membrane 620 in contact with column 610, and can therefore be removed.

In one embodiment, removal of shade membrane element 620 from column 610, can be accomplished in the reverse operation of that shown in FIGS. 6A-6D, for example, by reinserting tensioning rod 630 through the column, such that it couples to shade attachment mechanism 624, which can allow for support of the shade membrane element 620 while fasteners 628 are removed. Further actuation of tensioning rod 630 may then cause shade membrane element 620 to move away from column 610, allowing for a controlled relaxing of shade membrane element 620. In one embodiment, the use of tensioning rod 630 in removal allows for a removal process to occur more quickly, and more smoothly, than possible with previous designs.

Figure 6E:
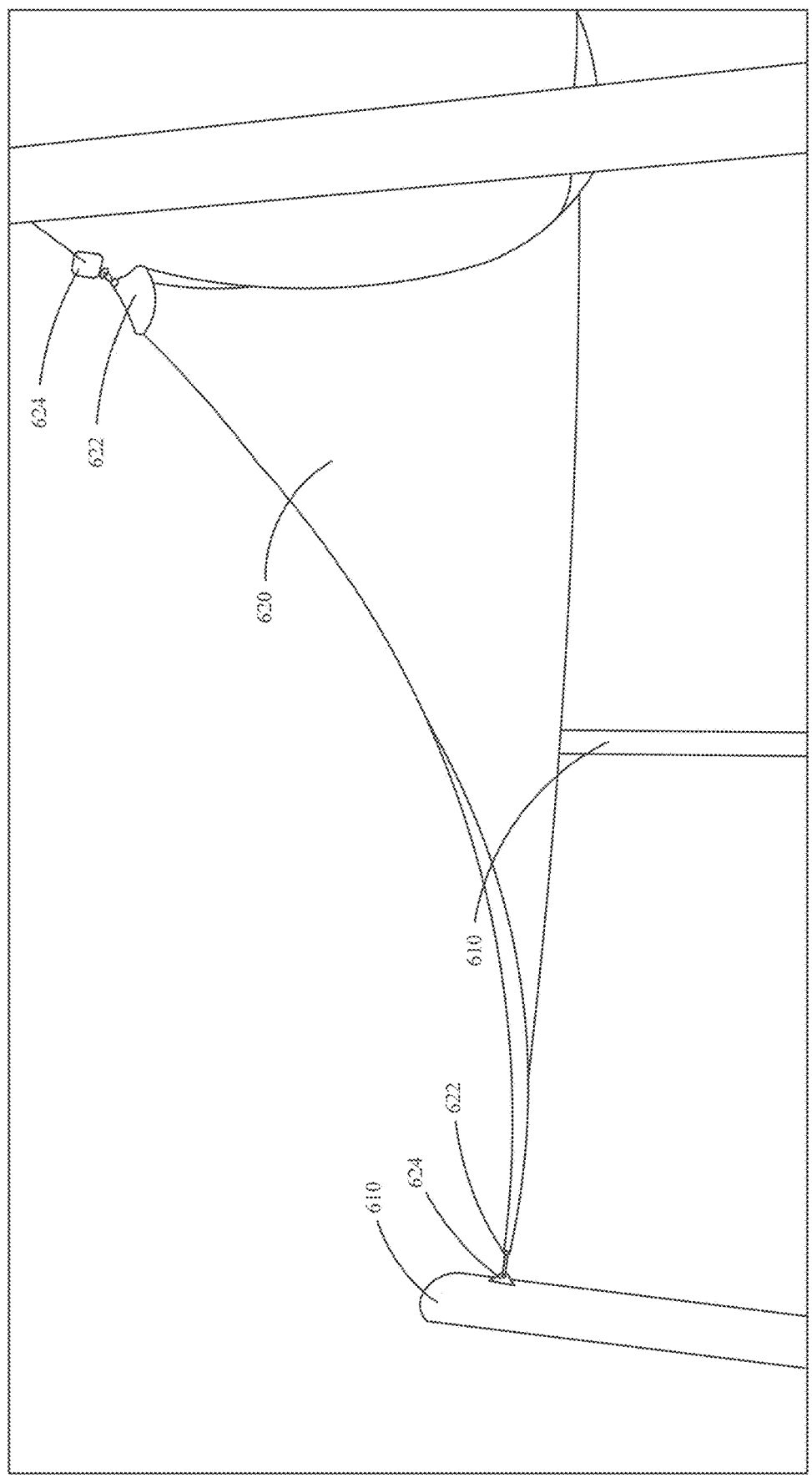

As illustrated in FIG. 6E, in one embodiment, shade membrane element 620 is coupled to multiple columns 610. Removal, therefore may be accomplished, in one embodiment, by removing one corner of shade membrane 620 from one column 610 at a time, or by first loosening the connections to each column. Use of tensioning rod 630, allows for controlled, but efficient removal of shade element 620 by first releasing some tension at each of columns 610, which allows for shade membrane element 620 to be more easily removed.

While the use of a tensioning rod, such as tensioning rod 630, allows for controlled removal of shade membrane elements from columns, it also presents storage requirements, as one or more tensioning rods 630 may need to be stored in proximity to the shade structure, such that in the event of inclement weather, or other removal needs, they can be easily retrieved and used. However, as shade structures are constructed with membranes designed to withstand most weather scenarios, removals may be infrequent, and without much warning, requiring storage for tensioning rods near the installation site, despite infrequent use. additionally, as illustrated in FIG. 6, in at least some embodiments, tensioning rods can be long, and therefore awkward to store onsite.

Therefore, in embodiments described below, with respect to FIGS. 7A-7C, a coupling mechanism is presented that couples a shade element to a column through a mechanism integral to the column. At least some mechanisms described herein present such features, such that removal can be accomplished easier, without specialized tools needing to be kept onsite.

Figure 7B:
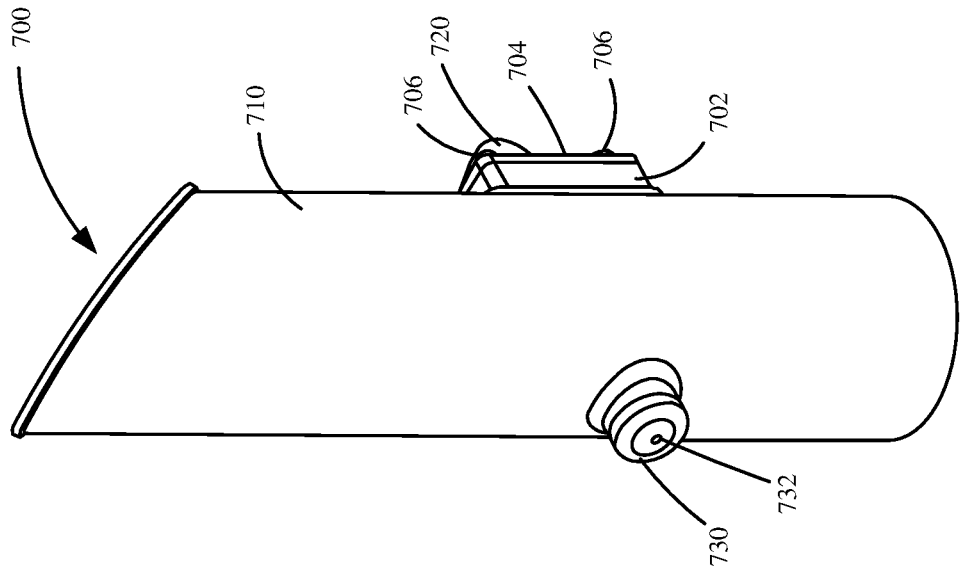
FIGS. 7A-7C illustrate a plurality of views of a coupling between a shade element and a column in accordance with a second embodiment of the present invention.
Figure 7A:
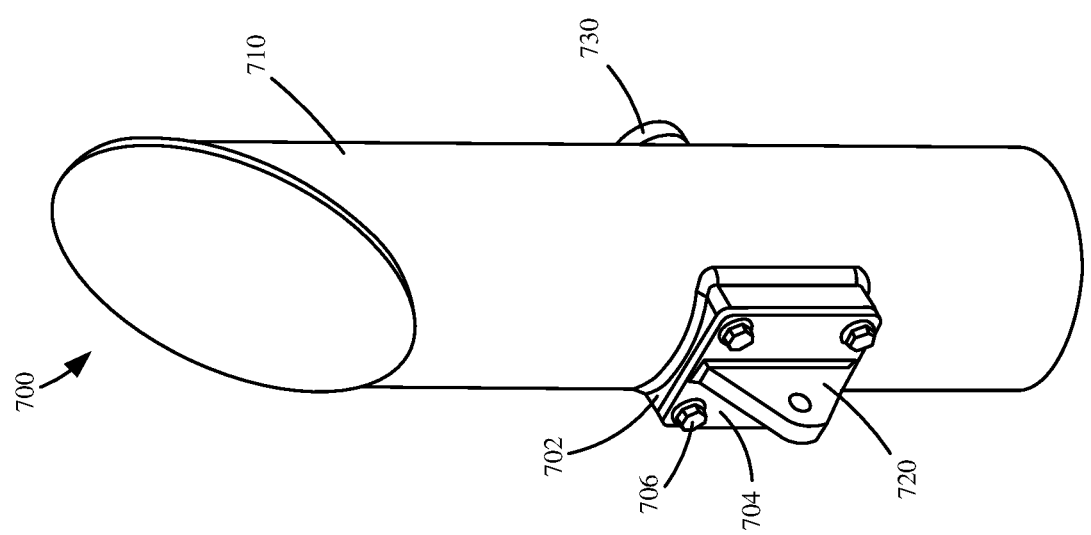
Figure 7C:
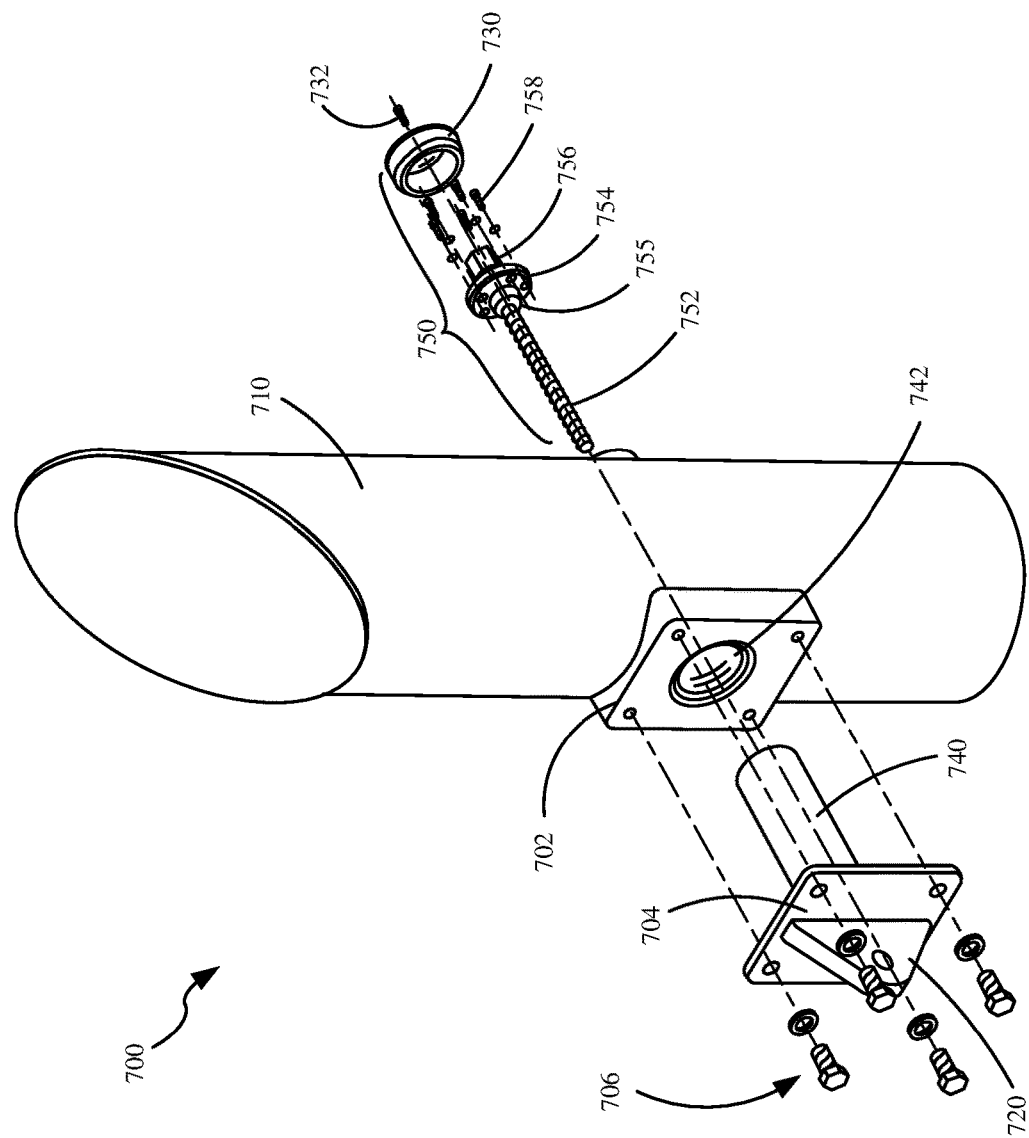

FIGS. 7A-7C illustrate a plurality of views of a coupling between a shade element and a column in accordance with a second embodiment of the present invention. FIGS. 7A and 7B illustrate perspective front and rear view respectively of a coupling between a shade membrane element (not shown for ease of illustration) and a column 710. The shade element used with column 710 may, in one embodiment, be coupled to a shade membrane such as that illustrated in FIGS. 5A-5D.

Coupling mechanism 700, in one embodiment, comprises an integral part of column 710 configured to couple to a shade membrane element (not shown, but configured to couple to shade membrane coupling mechanism 720). Coupling mechanism 700, in one embodiment, allows for easier and more efficient installation, and removal, of shade membranes from column 710 without the use of specialized tools. As shown in FIGS. 7A and 7B, on a front side of column 710, a column coupling plate 702 is attached to column 710. In one embodiment, column coupling plate 702 is permanently attached to column 710, for example by welding. However, other coupling mechanisms are also envisioned, for example bolting, simultaneous manufacture with column 710, or another suitable mechanism. Column coupling plate 702 is configured to couple to a membrane coupling plate 704, with shade membrane attachment mechanism 720 configured to couple to a membrane plate associated with a shade membrane (not shown). Additionally, in at least one embodiment, membrane coupling plate 704 is configured to couple directly to a shade membrane (not shown), without the use of a membrane coupling plate.

As illustrated in FIGS. 7A and 7B, plate 704, column coupling plate 702 and membrane coupling plate 704 comprises a substantially square shape. However, other shapes are also envisioned, for example triangles, circles, other polygons, or any other shape suitable for a given support structure. A plurality of fasteners 706, are configured to facilitate a coupling of membrane coupling plate 704 to column coupling plate 702, in one embodiment. As illustrated in FIGS. 7A and 7B, four fasteners 706 are used, in one embodiment. However, fewer fasteners could be used, for example only two, or three, in one embodiment. Additionally, in another embodiment, more than four fasteners could also be used, for example five, six, eight, or more.

On a rear side of column 710, in one embodiment, cap 730 is configured to couple to an internal sleeve extending substantially through column 710 (not shown in FIGS. 7A and 7B). Cap 730 is configured to close off internal mechanisms of connection assembly 700 from exterior access, such that they cannot be damaged by, or cause injury to, users of the shade assembly. Cap 730, in one embodiment, is coupled to assembly 700 by a fastener 732. In one embodiment, fastener 732 is a screw.

FIG. 7C illustrates an exploded view of a coupling 700 between a shade membrane element (not shown) and a column 710, for example such that a shade membrane element is configured to couple to shade membrane attachment mechanism 720. In one embodiment, as illustrated in FIG. 7C, a shade membrane element couples to shade membrane element attachment mechanism 720, which is attached to membrane coupling plate 704. Shade membrane coupling plate 704, in one embodiment, is coupled to a sleeve 740 configured to be received by, and move within bore 742. Bore 742, in one embodiment, extends substantially through column 710, and interfaces with cap 730, when an installation is complete.

Membrane coupling plate 704 is configured to be fastened to column coupling plate 702 by a series of fasteners 706. In one embodiment, fasteners 706 comprise screws, coupled to washers, that extend through both coupling plates 704, 706. However, other fastening mechanisms are also envisioned, in other embodiments, that allow for installation and removal of membrane coupling plate 704 to column coupling plate 702, for example, bolts or other removable fasteners.

Inside bore 742, in one embodiment, is an internal connection assembly 750 configured to interact with sleeve 740. For example, in one embodiment (as shown more clearly in FIG. 8 below) sleeve 740 comprises a receiving mechanism for threaded fastener 752 located within bore 742. In one embodiment, threaded fastener 752 comprises a screw. In one embodiment, threaded fastener 752 comprises a threaded ACME rod. Connection assembly 750, in one embodiment, comprises threaded fastening mechanism 752, coupled to a washer 754, and also coupled to a bolt 756 by a plurality of fasteners 758. In one embodiment, washer 754 comprises a notch 755 which is configured to ensure that, upon rotation of nut 756, threaded attachment mechanism 752 interacts with a receiving portion of internal sleeve 740, and does not linearly move within bore 742. In one embodiment, bore 742 may comprise one or more features configured to guide sleeve 740 into interaction with connection mechanism 750. For example, in one embodiment, bore 742 comprises a beveled edge.

Figure 8:
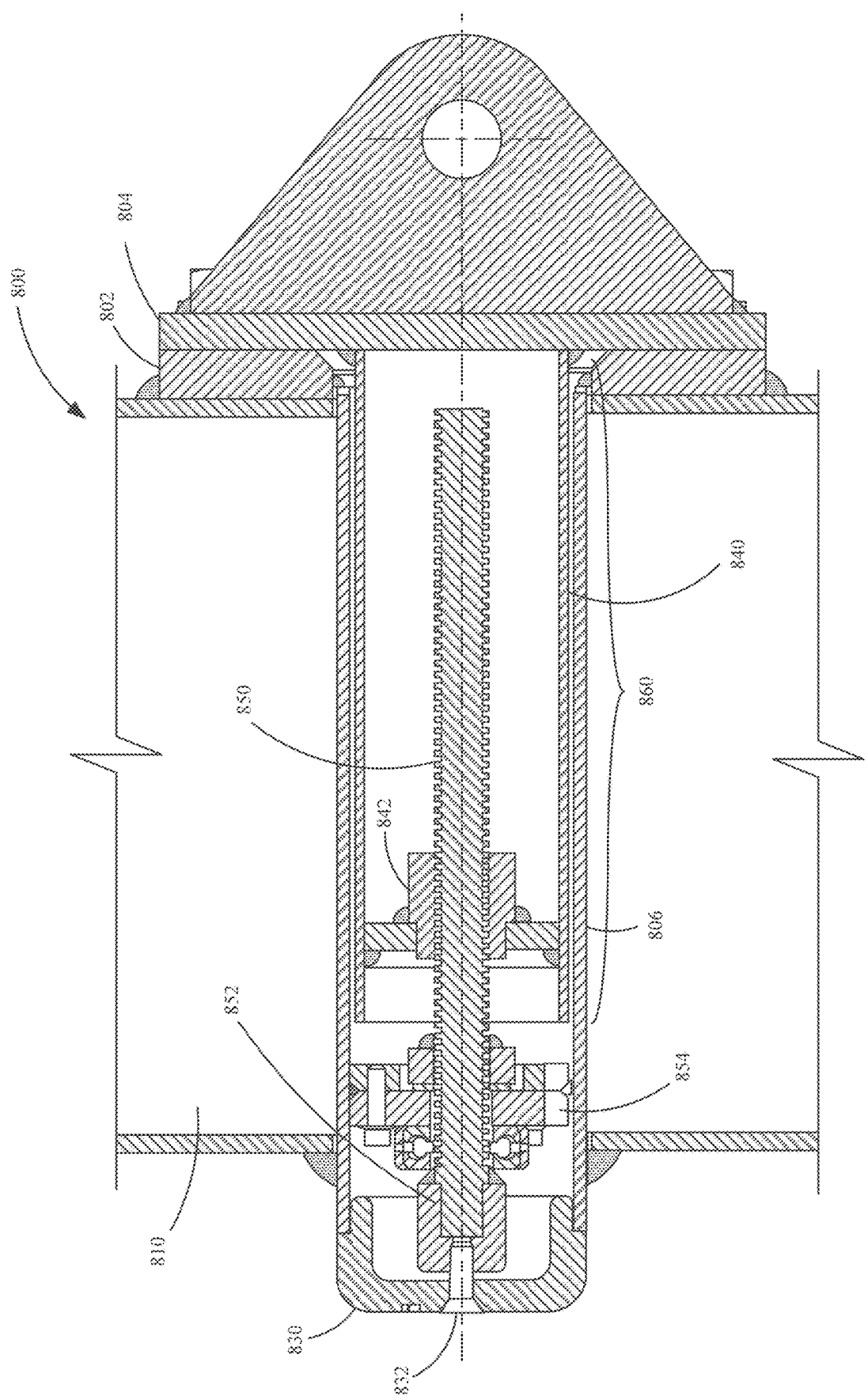
FIG. 8 illustrates a cross-sectional view of a coupling between a shade membrane element and a column in accordance with the second embodiment of the present invention.

FIG. 8 illustrates a cross-sectional view of a coupling between a shade membrane element and column in accordance with the second embodiment of the present invention. Coupling mechanism 800, as illustrated in FIG. 8, is located substantially within a column 810. It is to be understood that shade membrane attachment mechanism 820 is configured to attach to a shade membrane element prior to installation against column 810, however, for ease of illustration, the shade membrane element has been removed, and is not shown in FIG. 8.

As shown in the cross-sectional view of FIG. 8, shade membrane coupling plate 804 comprises a shade membrane attachment mechanism 820. In the embodiment illustrated in FIG. 8, shade membrane attachment mechanism 820 comprises a substantially triangle-shaped mechanism with an aperture for receiving a shade membrane. However, it is expressly contemplated that, in other embodiments, other shaped attachment mechanisms 820 are also envisioned, for example squares, rectangles, an eye bolt, or any other suitable configuration. Additionally, other suitable attachment mechanisms 820 are also envisioned, for example a receiving hook.

Shade membrane plate 804 is also coupled, in one embodiment, to a moveable sleeve 840, which is configured to fit within, and extend substantially along a connection path within coupling sleeve 806. Coupling sleeve, in one embodiment, extends completely through column 810. In one embodiment, threaded attachment mechanism 850 extends substantially through column 810. In one embodiment, threaded attachment mechanism 850 is prevented from linear movement within column 810 by a collar bearing 854. In one embodiment, movable sleeve 840 comprises a fastener receiving mechanism 842 configured to interact with threaded attachment mechanism 850. Therefore, in installing a shade membrane to a column 810, using mechanism 800, the shade membrane only needs to be brought within a distance 860 of the column 810 by manual force, or other mechanism. For example, in the embodiment where column 810 is a 10-inch column, the shade element only needs to be manually brought within a portion of the diameter of the column, for example less than 10 inches, in order to facilitate installation using mechanism 800.

Similarly, when releasing a shade membrane from column 810, mechanism 800 will allow for the removal of tension from the shade membrane equivalent to distance 860. When sleeve 840, with receiving portion 842, is close enough that it can interact with threaded mechanism 850, actuation of actuation mechanism 852, available by removing cap 830 and fastener 832, will cause membrane coupling plate 804 to be brought nearer to, and eventually engage, assembly 802. In one embodiment, actuation mechanism 852 comprises a head 852. Once membrane coupling, plate 804 engages column coupling plate 802, additional fasteners (not shown in FIG. 8) can be used to complete a coupling between the shade membrane element and column 810.

FIGS. 9A-9D illustrate an example installation sequence of a shade structure in accordance with an embodiment of the present invention. As illustrated in FIGS. 9A-9D, a shade element (not shown, but understood to couple to coupling feature 920) can be coupled to a column 910 using an assembly such as assembly 900.

Figure 9A:
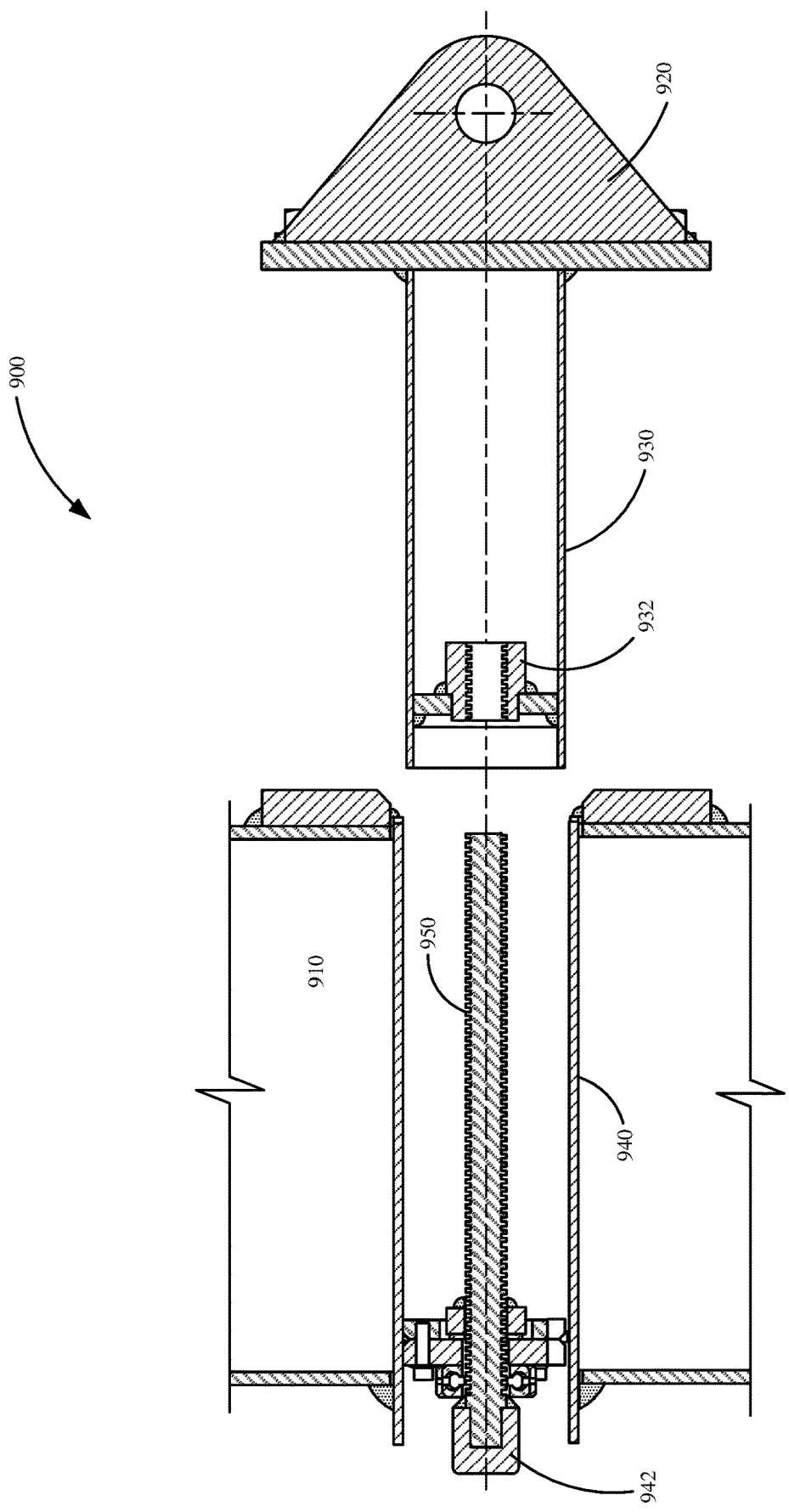
FIGS. 9A-9D illustrate an example installation sequence of a shade structure in accordance with an embodiment of the present invention.

FIG. 9A illustrates a shade element attachment mechanism 920 nearing a column 910. For example, a shade membrane element coupled to shade element attachment mechanism 920 may be positioned close to column 910 through the use of manual force.

Figure 9B:
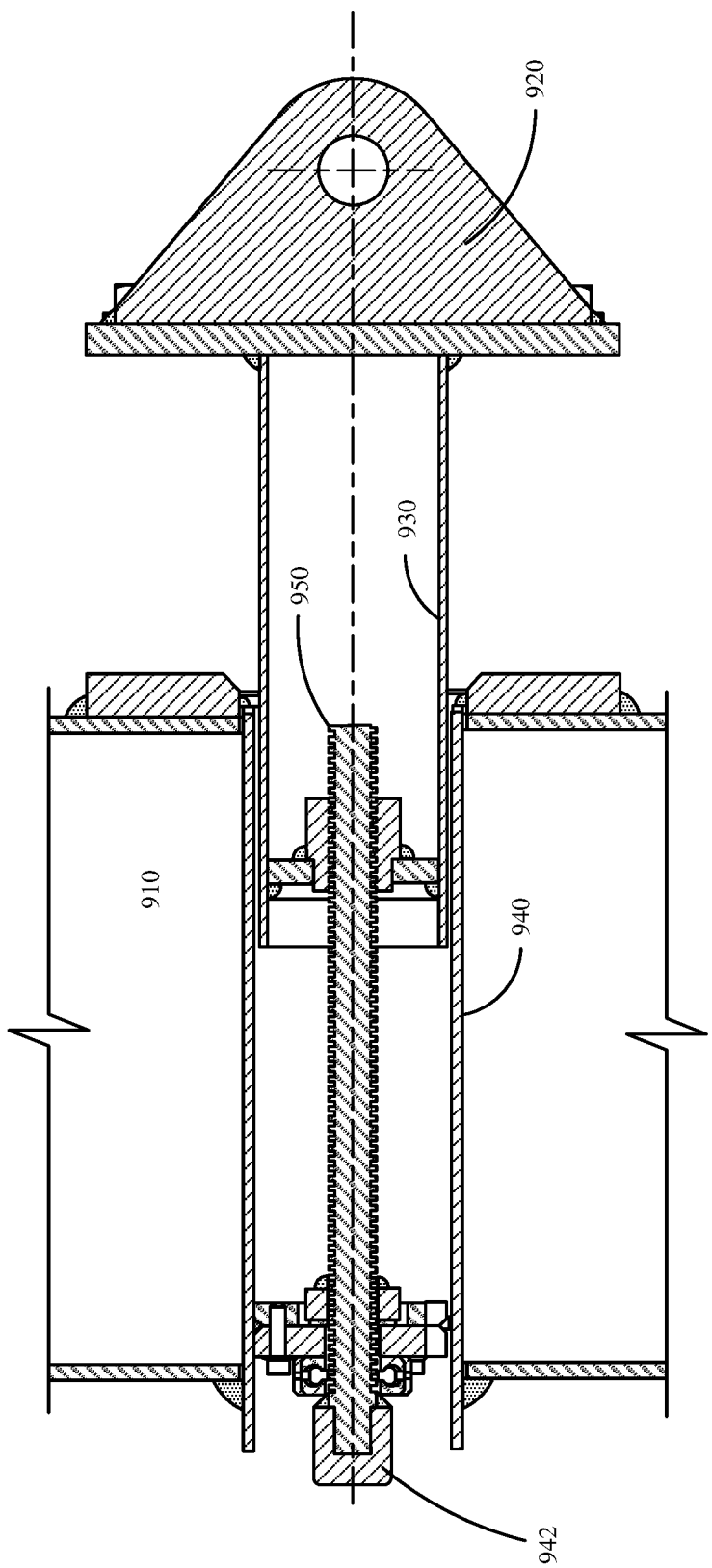

FIG. 9B illustrates a shade mechanism coupled to attachment mechanism 920 engaging with an internally threaded mechanism 950 within assembly 900. A membrane attachment sleeve 930, in one embodiment, comprises a receiving portion 932 configured to engage a threaded fastening mechanism 950. In one embodiment, fastening mechanism 950 comprises a threaded ACME rod. However, other fastening mechanisms are also envisioned. Once engaged, actuation of a head 942, attached to threaded fastening mechanism 950, causes membrane attachment sleeve 930 to move within internal assembly sleeve 940, drawing a shade membrane, attached to attachment mechanism 920, into a coupling alignment with column 910.

Figure 9C:
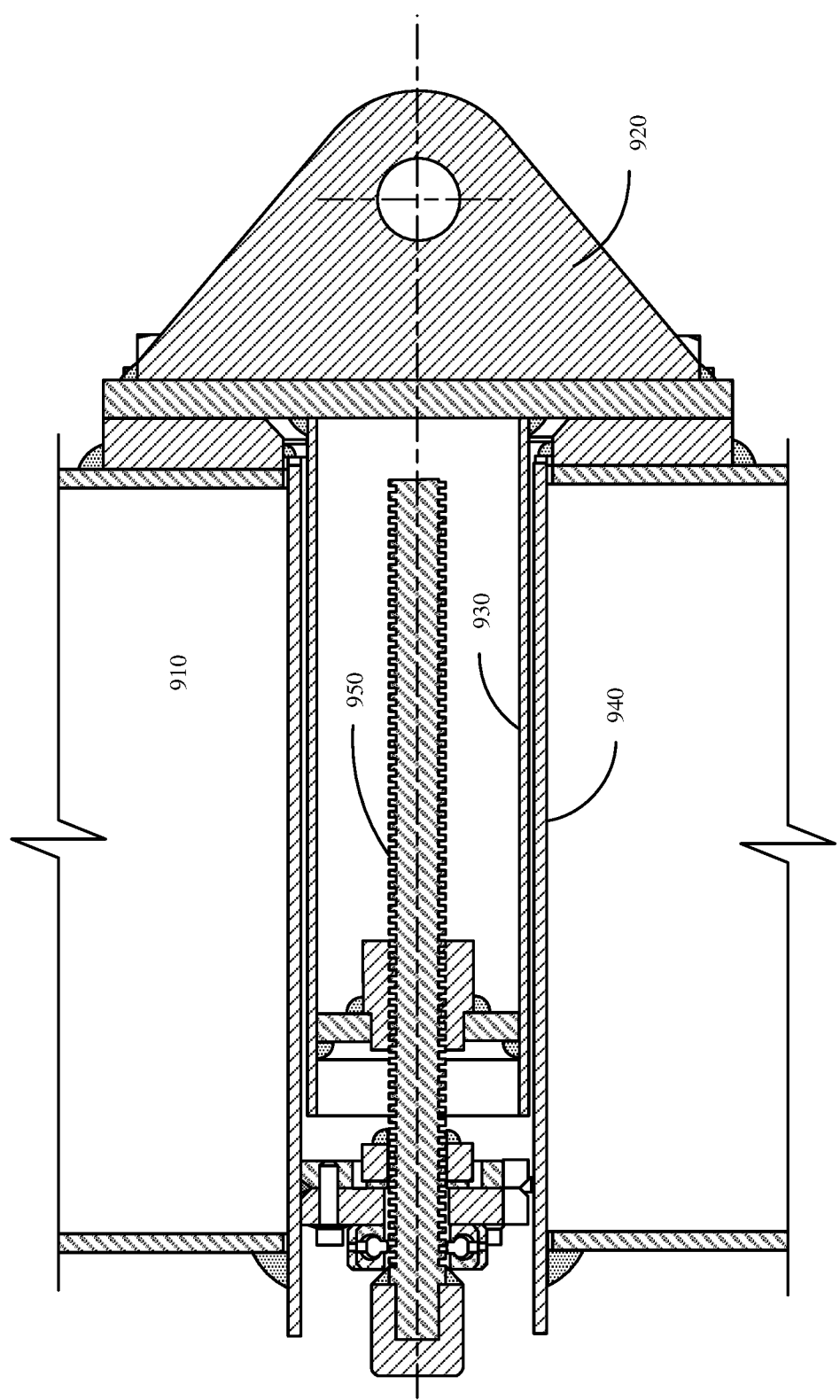

FIG. 9C illustrates a shade assembly attachment mechanism flush with column 910, in an alignment position facilitated by assembly 900. One benefit of using an embodiment such as that described herein, is that shade attachment mechanism 920 will automatically align in an alignment position with respect to a coupling plate on column 910, allowing for easy coupling of permanent fasteners (not shown in FIGS. 9A-91)).

Figure 9D:
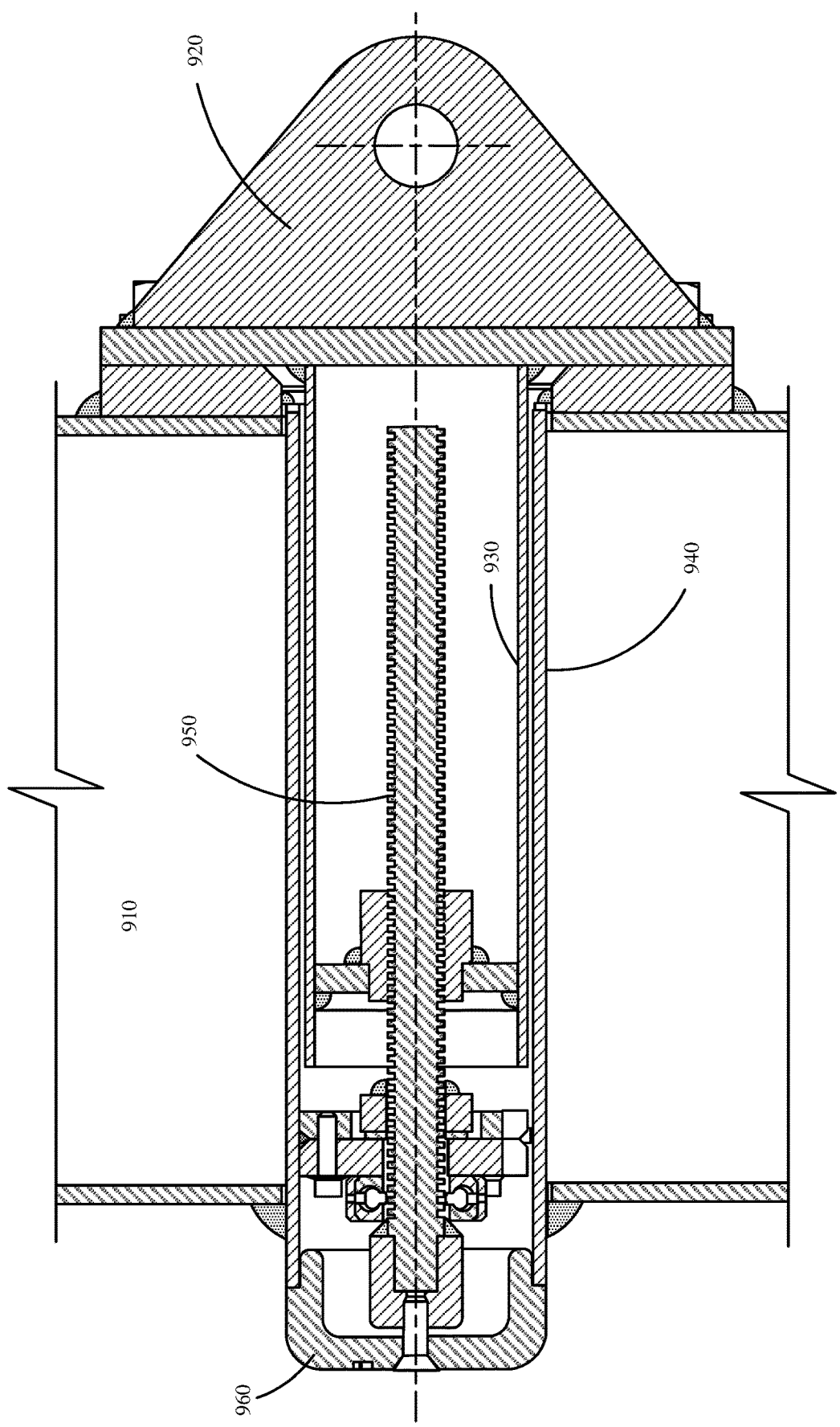

As illustrated in FIG. 9D, once a coupling has been completed, a cap 960 is installable over head 942, securing assembly 900 from potential vandalism, or damage due to weather-related elements. As would be understood, removal of a shade membrane from column 910 is accomplished in reverse. For example, removing cap 960, actuating a nut in a reverse direction, such that sleeve 930 moves in a direction away from the nut, until it is released from the internal assembly, and the shade membrane can be removed.

Figure 10:
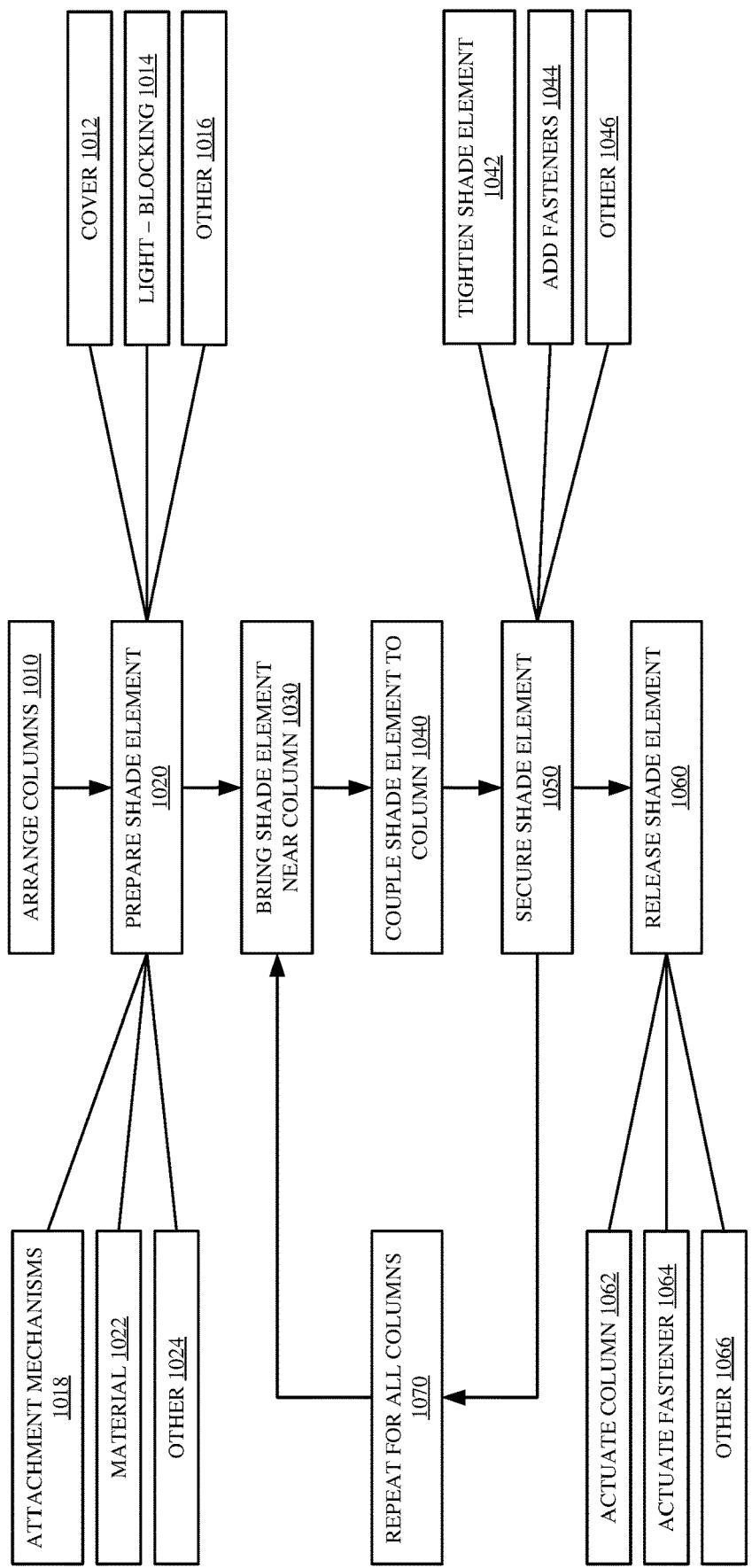
FIG. 10 illustrates one example of a method of installing a shade structure in accordance with an embodiment of the present invention.

FIG. 10 illustrates one example of a method of installing a shade structure in accordance with an embodiment of the present invention. Method 1000 illustratively allows for a removable installation of a shade membrane element to a column installed in an outdoor environment. Use of method 1000 may allow for the shade membrane element to easily be removed in the event of inclement weather, or in response to a repair or replacement need.

In block 1010, columns are arranged. In one embodiment, support structures, such as columns, are arranged in an outdoor environment in a substantially permanent fashion, for example, installed within a concrete layer, partial-burying, or other permanent or semi-permanent fashion such that a portion of the support structure extends below ground level. While the columns are substantially permanently installed, shade membrane elements, in one embodiment, are also durable when exposed to weather related conditions, but removable as needed.

In block 1020, a shade membrane element is prepared for installation. The shade element may comprise a covering feature, as illustrated in block 1012, a light blocking feature, as illustrated in block 1014, or other desired features, as illustrated in block 1016. Preparing a shade element, as indicated in block 1018, can comprise attaching attachment mechanisms, such as membrane plates and fasteners, and coupling mechanisms. Preparing a shade element can also comprise, as indicated in block 1022, treating or preparing shade membrane fabric. Additionally, other preparations, as indicated in block 1024, are also envisioned.

In block 1030, a shade element is brought near the column. Bringing a shade element near a column may be done manually, in one embodiment, or through a machine-aided technique, such as a tensioning rod as described with respect to FIG. 3, or any other suitable technique.

In block 1040, the shade element is coupled to the column, for example using an internal mechanism such as that described with respect to FIG. 7, in one embodiment, or through the use of a tensioning rod, as described with respect to FIG. 3, in another embodiment.

In block 1050, the shade element is secured to the column. Securing may comprise, in one embodiment, tightening a shade element to a desired level of tautness, as indicated in block 1042. Additionally, in one embodiment, securing a shade element can comprise the addition of fasteners, as indicated in block 1044, to more securely couple the shade element to the column. Additionally, other securing mechanisms and steps are also envisioned, as indicated in block 1046.

In block 1070, in one embodiment, the steps illustrated in blocks 1030, 1040, and 1050 are repeated, such that the shade element is attached to all desired attachment points, for example other columns, support structures, ground-level attachment points, etc.

In block 1060, as needed, the shade element is released. Releasing a shade element may comprise actuating a column release element, as indicated in block 1062, removing fasteners, as indicated in block 1064, or using another removal mechanism, as indicated in block 1066. For example, removing a shade element may comprise, with respect to the embodiment described in FIG. 7, removing an end cap, actuating an actuation mechanism, such as a nut or a head, the shade membrane attachment mechanism out of a coupling with the column. Additionally, actuating at a column point, as indicated in block 1066, could also comprise removing a cap and reinserting a tensioning rod, such as that described with respect to FIG. 3, through the column such that the shade membrane can be more controllably removed from the column. Additionally, actuating fasteners can comprise removing fasteners between a membrane plate and a column attachment assembly, as described in accordance with embodiments herein.

Figure 11:
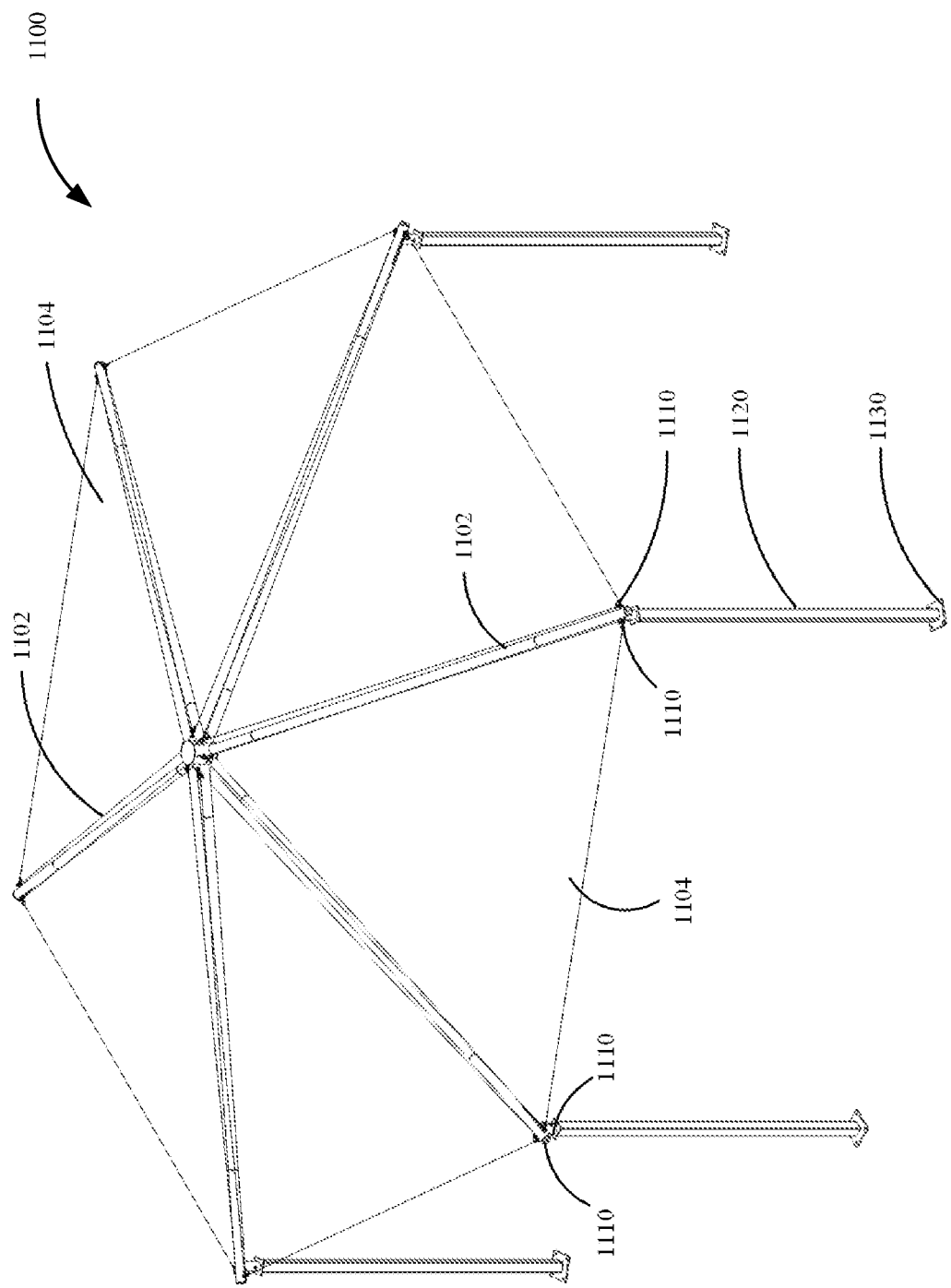
FIG. 11 illustrates one example configuration of a shade structure in accordance with an embodiment of the present invention.

FIG. 11 illustrates one example configuration of a shade structure in accordance with an embodiment of the present invention. Structure 1100 comprises a plurality of membranes 1104 coupled between structural components 1102. Membrane 1104 couples to a structural component 1102 at a coupling point 1110. In one embodiment, each membrane 1104 is configured to couple to multiple coupling points 1110. Membranes 1104 may couple to coupling point 1110 using, for example, a membrane plate similar to those described previously. Additionally, other suitable coupling mechanisms can also be used. Structural components 1102 comprise straight rafter, in one embodiment. However, in other embodiments, components 1102 may be partially curved, or comprise a different suitable shape. Structural components 1102 couple to mounting components 1120, which are configured to couple to a mounting point 1130. In one embodiment, mounting point 1130 comprises a permanent mounting, for example to a below-ground footing. However, in another embodiment, only mounting mechanism 1130 is permanently fixed in-ground, and components 1102 and 1120 are configured to be removeably installed, for example in case of weather, cleaning, or repair concerns.

Figure 12A:
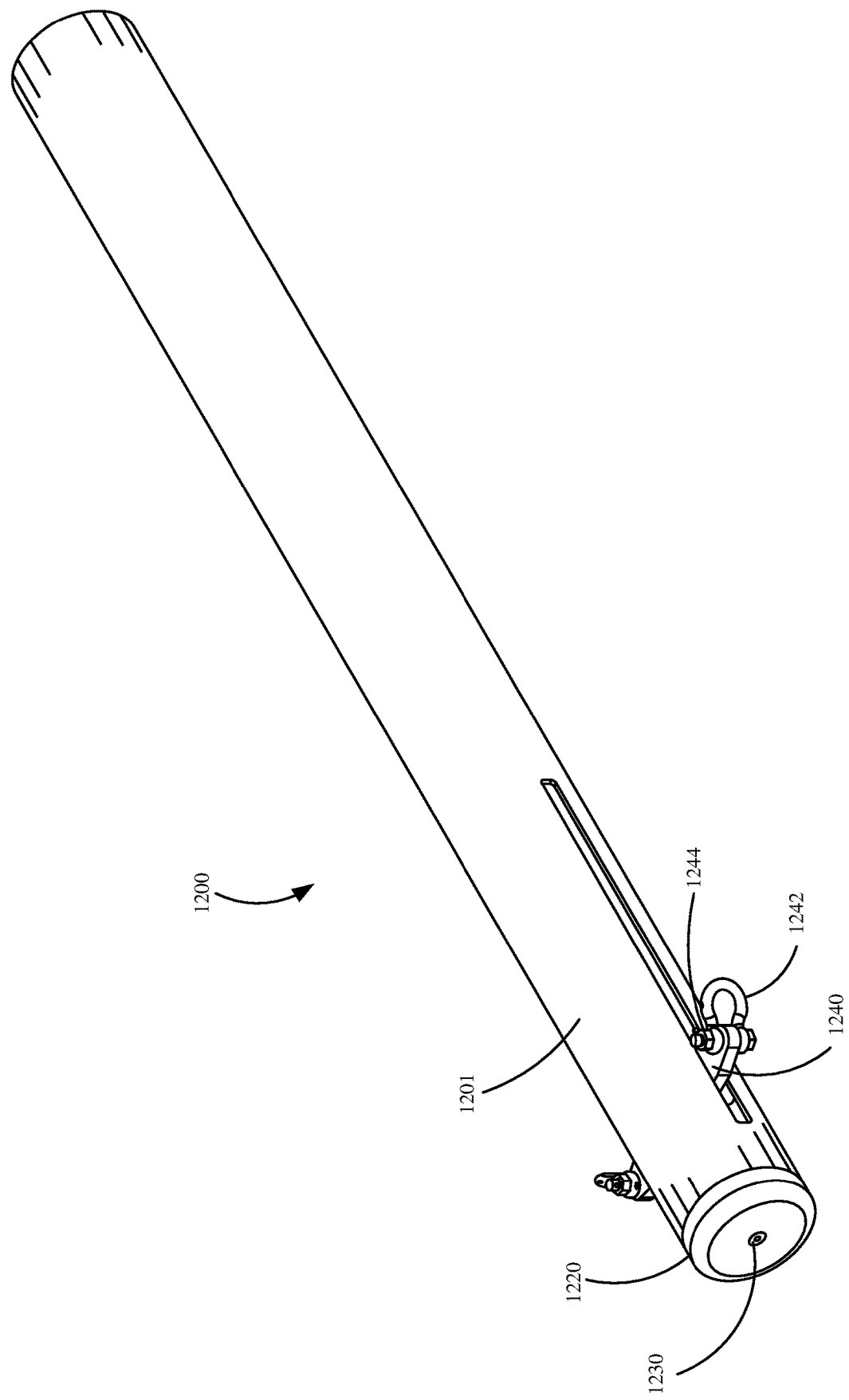
FIGS. 12A-C illustrate different views of a multi-membrane coupling mechanism for a shade release mechanism for a shade structure in accordance with an embodiment of the present invention.
Figure 12B:
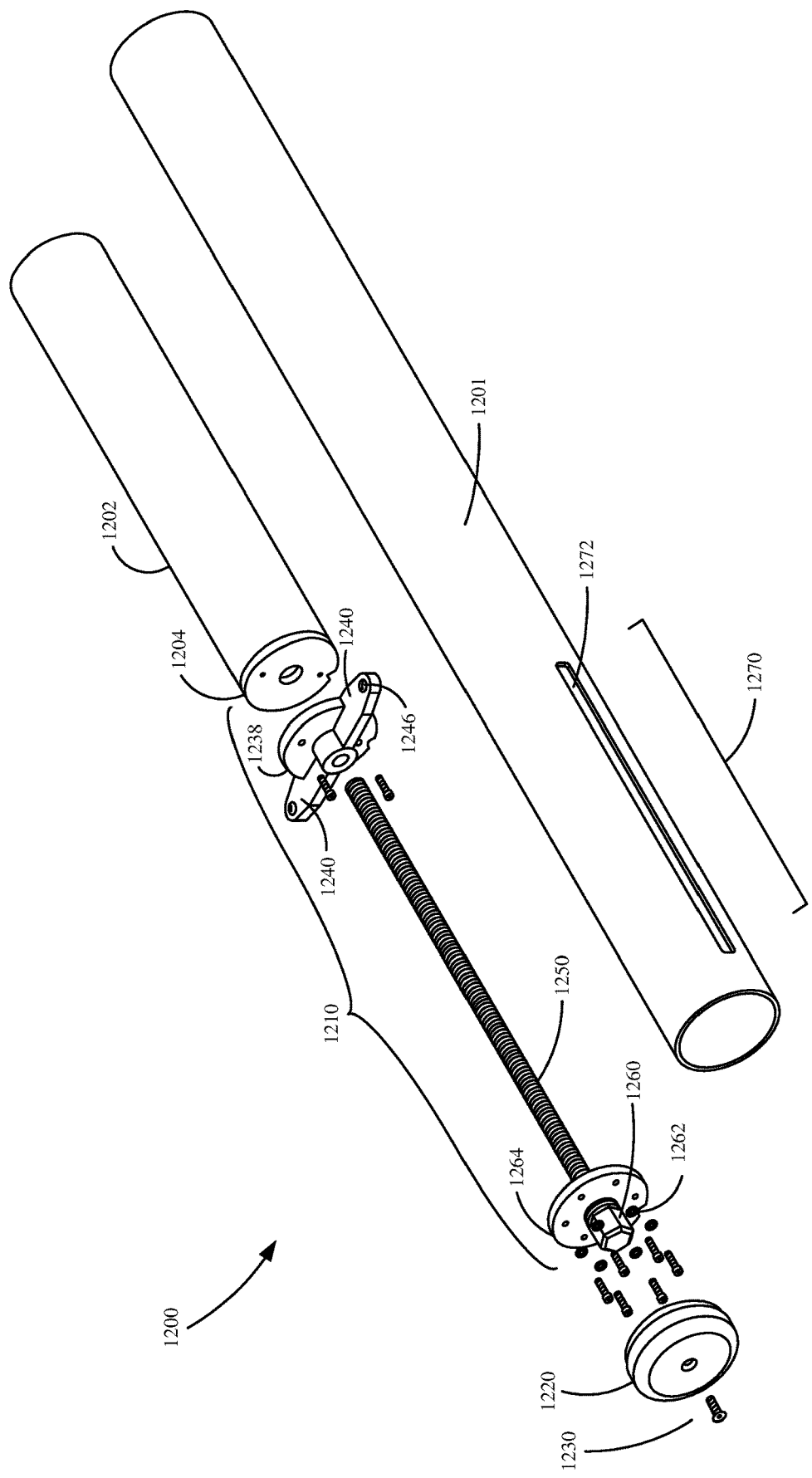
Figure 12C:
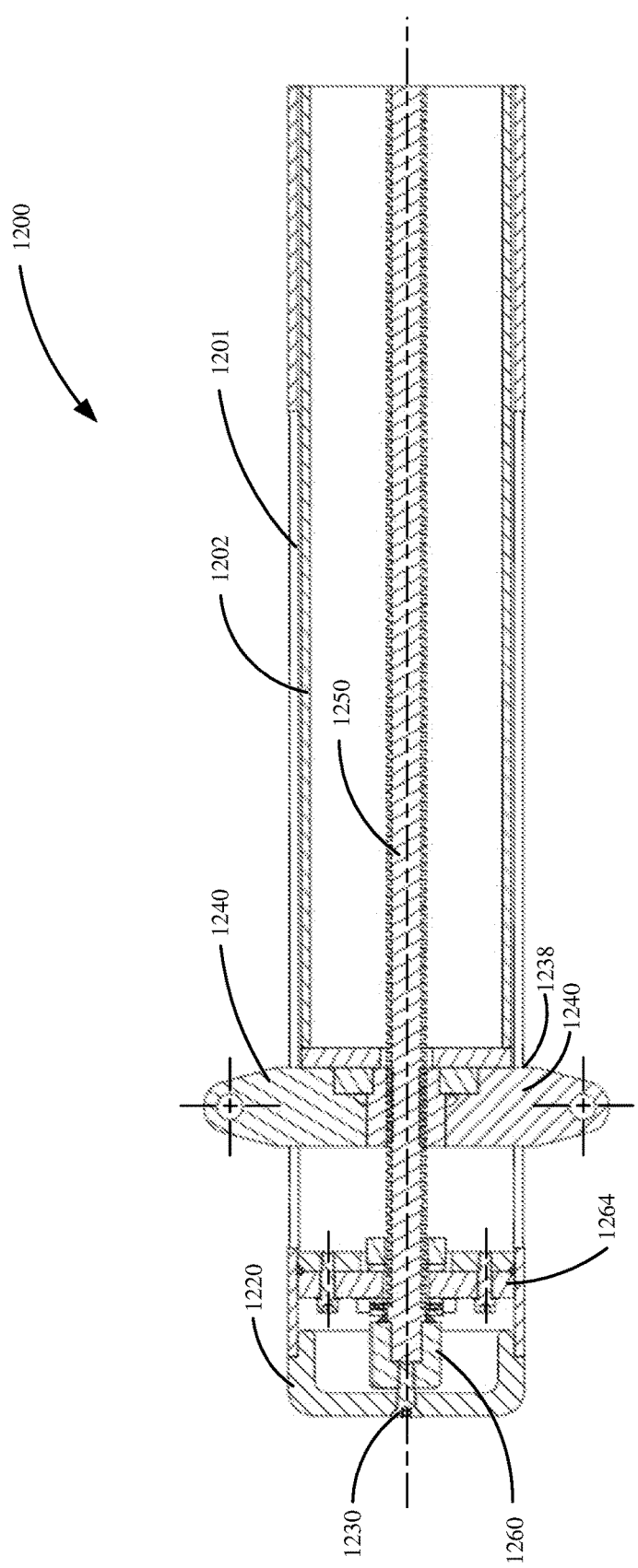

FIGS. 12A-C illustrate different views of a multi-membrane coupling mechanism for a shade release mechanism for a shade structure in accordance with an embodiment of the present invention.

FIG. 12A illustrates an assembled view of a release system 1200. System 1200 includes a structural component 1201. There are one or more coupling points 1240. A coupling mechanism 1242 may be configured to couple to a membrane, or a membrane plate, similar to the configurations discussed above in relation to other embodiments. Coupling mechanism 1242 may be coupled to coupling point 1240 using a fastener 1244. Fastener 1244 may comprise nuts and bolts, as illustrated in FIG. 12A, or another suitable fastening mechanism. As illustrated in FIG. 12B, coupling point 1240 may comprise an associated moveable tab 1238 configured to move forward and backward along an axis of structural component 1201.

System 1200 may also comprise a cap 1220 with a fastener 1230. For example, it may be advantageous to keep the internal components of 1200 enclosed—for example to reduce degradation due to weather and potential tampering. Cap 1220 may couple to system 1200 through fastener 1230. Fastener 1230 may comprise, for example, a threaded fastener such as a screw.

FIG. 12B illustrates an exploded view of the release system 1200. In one embodiment, structural component 12012 is at least partially hollow, and serves as a housing. A release assembly 1210 comprises a threaded member 1250, coupled to the moveable tab 1238, which is configured to move along an axis defined by threaded member 1250. The movement of the moveable tab 1238, in one embodiment, is confined to the range 1270 defined by a slot 1272 in structural component 1201. This is, because the moveable tab 1238 is inserted into structural component 1201 such that the coupling points 1240 each extend through their respective slot 1272. Thus, in one embodiment, the moveable tab 1238 is associated with two membrane coupling points 1240. Membrane coupling points 1240 are configured to move along slots 1272 as a membrane is tightened and released by moving the moveable tab 1238 along threaded member 1250 by turning the threaded member 1250 by way of a nut 1260, Structural member 1202 is illustratively inserted into structural member 1201 ahead of moveable tab 1238 such that member 1202 is slidably received within member 1201. Moveable tab 1238 is then attached to an end cap 1204 of member 1202 such that member 1202 will move up and down threaded member 1250 as moveable tab 1238 moves up and down threaded member 1250. All of this is made more clear in FIG. 12C.

Threaded member 1250 is also supported by a tightening plate 1260. As has been alluded to, actuation of nut 1260 causes threaded membrane to actuate moveable tab 1238, thereby either adding or removing tension to a coupled shade membrane. In one embodiment, plate 1264 comprises a notch 1262 which is configured to ensure that, upon rotation of nut 1260, plate 1260 does not linearly move within component up and down threaded member 1250.

FIG. 12C illustrates a cutaway view of an assembled system 1200. Threaded member 1250 is configured to extend at least partially through components 1201 and 1202, and extend through tightening plate 1264, As illustrated in FIG. 12C, in one embodiment, coupling mechanisms 1240 are arranged substantially 180 degrees apart, with respect to threaded member 1250.

FIG. 13 illustrates one example of a method of installing a shade structure with a multi-membrane tension coupling mechanism.

In block 1310, a tension release system is installed. Installation may comprise a tension release system installed in each support pole of a shade structure, as indicated in block 1302. However, in some embodiments, installation comprises fewer tension release systems than support poles of a shade structure, as indicated in block 1304. The tension release system can be at least partially installed in a support pole, for example, by a manufacturer prior to shipment, as indicated in block 1306. In another embodiment, installation comprises assembling the tension release system during a shade structure installation process, as indicated in block 1308. Another installation process can also be employed, as indicated in block 1312.

In block 1320, a shade membrane is coupled to the tension release mechanism. As indicated in block 1314, in one embodiment a single shade membrane is coupled to the tension release mechanism. However, two shade membranes can also be coupled to a single tension release mechanism, as indicated in block 1316. As illustrated in FIG. 12C, two shade membranes can be coupled such that they are on opposing sides of a tensioning rod. However, other configurations are also envisioned, for example the two shade membranes at an acute, or an obtuse angle with respect to each other, as indicated in block 1318.

Coupling the shade membrane to the tension release mechanism can comprise a coupling between a fastening mechanism associated with the tension release mechanism and a membrane plate, as indicated in block 1322. In another embodiment, the tension release mechanism couples directly to a shade membrane, as indicated in block 1324. Other configurations are also envisioned, as indicated in block 1326.

In block 1330, tension is applied to the membrane. In one embodiment, tension is applied by actuating the tension release system, for example actuation of a threaded member, which causes movement of a coupling mechanism along an axis defined by the threaded member in a direction that causes tension to be applied to the shade membrane.

In block 1340, tension is released from the membrane. In one embodiment, tension is released by actuating the tension release system, for example in an opposite manner from that of block 1330. For example, clockwise rotation of a nut may cause tension to be applied, while counterclockwise motion may cause tension to be released. In another embodiment, clockwise rotation causes tension to be released, while counterclockwise motion causes tension to be applied.

The use of embodiments described herein may allow for more controllable attachment for shade mechanisms to columns, and removal therefrom. However, one skilled in the art would understand that at least some of the embodiments described herein are illustrative only, and other suitable materials and configurations could also be used.

Although the present invention has been described with reference to preferred embodiments, workers skilled in the art will recognize that changes may be made in form and detail without departing from the spirit and scope of the invention.

What is claimed is:

1. A tensioning system for a shade structure, comprising:
a moveable tab connected to at least two coupling points;
a threaded member configured to, when actuated, move the moveable tab;
a first structural component having therein formed multiple slots, wherein each one of the coupling points extends through one of the slots; and
a second structural component that is connected to the moveable tab, the second structural component being slidably received within the first structural component such that the second structural component slides within the first structural component whenever the threaded member is actuated and moves the moveable tab, wherein the second structural component effectively closes or open a portion of the slots as it slides within the first structural component.

2. The tensioning system of claim 1, wherein the second structural component is movably attached to the threaded member.

3. The tensioning system of claim 1, wherein the threaded member, the first structural component, and the second structural component all share a common axis.

4. The tensioning system of claim 1, wherein the first structural component has a substantially cylindrical shape.

5. The tensioning system of claim 1, wherein the second structural component has a substantially cylindrical shape.

6. The tensioning system of claim 1, wherein the first and second structural components both have substantially cylindrical shapes.

7. The tensioning system of claim 1, further comprising a cap for concealing a device for facilitating rotation of the threaded member.

8. The tensioning system of claim 1, further comprising a nut configured to turn the threaded member.

9. The tensioning system of claim 8, further comprising an end cap that covers the nut.

10. The tensioning system of claim 8, wherein the coupling points move through the slots as the threaded member is actuated.

11. A tensioning system for a shade structure, comprising:
a moveable tab connected to at least two oppositely oriented coupling points;
a threaded member configured to, when rotated, move the moveable tab;
a first structural component having therein formed multiple slots, wherein each one of the coupling points extends through one of the slots; and
a second structural component that is connected to the moveable tab, the second structural component being slidably received within the first structural component such that the second structural component effectively opens or closes said slots when the threaded member is rotated.

12. The tensioning system of claim 11, wherein the threaded member, the first structural component, and the second structural component all share a common axis.

13. The tensioning system of claim 11, wherein the first structural component has a substantially cylindrical shape.

14. The tensioning system of claim 11, wherein the second structural component has a substantially cylindrical shape.

15. The tensioning system of claim 11, wherein the first and second structural components both have substantially cylindrical shapes.

16. The tensioning system of claim 11, further comprising a cap for concealing a device for facilitating rotation of the threaded member.

17. The tensioning system of claim 11, further comprising a nut configured to turn the threaded member.

18. The tensioning system of claim 17, further comprising an end cap that covers the nut.

19. The tensioning system of claim 17, wherein the coupling points move through the slots as the threaded member is actuated.

* * * * *